United States Patent

(12) United States Patent
Godavari

(10) Patent No.: US 8,957,918 B2
(45) Date of Patent: Feb. 17, 2015

(54) METHODS FOR IMPLEMENTING MULTI-TOUCH GESTURES ON A SINGLE-TOUCH TOUCH SURFACE

(75) Inventor: Sri Venkatesh Godavari, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 948 days.

(21) Appl. No.: 12/611,549

(22) Filed: Nov. 3, 2009

(65) Prior Publication Data

US 2011/0102464 A1    May 5, 2011

(51) Int. Cl.
*G09G 5/00* (2006.01)
*G06F 3/041* (2006.01)
*G06F 3/0488* (2013.01)

(52) U.S. Cl.
CPC .......... *G06F 3/0416* (2013.01); *G06F 3/04883* (2013.01); *G06F 2203/04104* (2013.01)
USPC ............. 345/648; 345/650; 345/84; 345/174; 345/179; 345/178; 345/177; 345/168; 345/661; 345/671; 345/620; 345/173; 715/863; 715/702; 715/790; 715/864; 715/865

(58) Field of Classification Search
CPC . G06F 3/04845; G06F 3/0481; G06T 3/0006; G01T 1/1611; G01T 1/1647
USPC ........... 345/650, 661, 173, 84, 174, 179, 175, 345/178, 177, 168, 671, 620; 715/863, 702, 715/790, 864, 865
See application file for complete search history.

(56) References Cited

U.S. PATENT DOCUMENTS

| 4,914,624 | A  * | 4/1990 | Dunthorn ...................... 345/173 |
| 6,943,779 | B2 * | 9/2005 | Satoh ............................. 345/173 |
| 6,958,749 | B1 * | 10/2005 | Matsushita et al. ........... 345/175 |
| 7,034,806 | B2 * | 4/2006 | Nakagawa ..................... 345/168 |
| 7,053,887 | B2 * | 5/2006 | Kraus et al. ................... 345/173 |
| 7,176,904 | B2 * | 2/2007 | Satoh ............................. 345/173 |
| 2002/0036618 | A1 * | 3/2002 | Wakai et al. .................. 345/157 |
| 2005/0046621 | A1 * | 3/2005 | Kaikuranta .................... 345/173 |

(Continued)

FOREIGN PATENT DOCUMENTS

| JP | 2000163031 A | 6/2000 |
| JP | 2001134382 A | 5/2001 |

(Continued)

OTHER PUBLICATIONS

International Search Report and Written Opinion of the International Searching Authority for PCT/US2010/052921, International Searching Authority—European Patent Office. Feb. 25, 2011.

*Primary Examiner* — Abderrahim Merouan
(74) *Attorney, Agent, or Firm* — Shirin Tefagh

(57) ABSTRACT

Methods for activating multi-touch functionality by recognizing and processing multi-touch interactions on a touch surface of non-multi-touch computing devices. The computing device may detect a jump from the location of the first touch event to determine that a multiple touch gesture is being traced. Virtual touch events are detected and stored. Using mathematical formulae, parameters are calculated based on initial and subsequent virtual touch event locations. Based on these parameters the multi-touch functionality is determined, such as a zooming or rotating function. A transform factor may be determined and applied to the image display.

32 Claims, 15 Drawing Sheets

(56) References Cited

U.S. PATENT DOCUMENTS

| | | |
|---|---|---|
| 2005/0264541 A1* | 12/2005 | Satoh .......................... 345/173 |
| 2006/0022955 A1* | 2/2006 | Kennedy ...................... 345/173 |
| 2006/0025218 A1* | 2/2006 | Hotta ............................ 463/37 |
| 2006/0026535 A1* | 2/2006 | Hotelling et al. ............ 715/863 |
| 2006/0097991 A1* | 5/2006 | Hotelling et al. ............ 345/173 |
| 2006/0125803 A1* | 6/2006 | Westerman et al. .......... 345/173 |
| 2006/0238517 A1* | 10/2006 | King et al. ................... 345/173 |
| 2006/0274046 A1* | 12/2006 | Hillis et al. .................. 345/173 |
| 2008/0165141 A1* | 7/2008 | Christie ........................ 345/173 |
| 2008/0180406 A1* | 7/2008 | Han et al. ..................... 345/173 |
| 2009/0109191 A1* | 4/2009 | Felder et al. ................. 345/174 |
| 2009/0128516 A1 | 5/2009 | Rimon et al. |
| 2009/0146963 A1 | 6/2009 | Yeh et al. |
| 2009/0189877 A1* | 7/2009 | Washino et al. .............. 345/174 |
| 2010/0079501 A1* | 4/2010 | Ikeda et al. ................... 345/661 |
| 2011/0013049 A1* | 1/2011 | Thorn ......................... 348/240.3 |

FOREIGN PATENT DOCUMENTS

| | | |
|---|---|---|
| JP | 2008508601 A | 3/2008 |
| JP | 2008102179 A | 5/2008 |
| JP | 2009146374 A | 7/2009 |
| JP | 2009176114 A | 8/2009 |
| WO | 2006020305 A2 | 2/2006 |

\* cited by examiner

| Parameters | Gesture | Direction of P2/P3 | Display Function |
|---|---|---|---|
| c < c' | Pinch Gesture | Up | Zoom-in |
| c > c' | Pinch Gesture | Down | Zoom-out |
| d < d' | Pinch Gesture | Up | Zoom-in |
| d > d' | Pinch Gesture | Down | Zoom-out |
| D > 0° | Rotating Gesture | Counterclockwise | Rotate counterclockwise |
| D > 0° | Rotating Gesture | Clockwise | Rotate clockwise |
| C > C' | Rotating Gesture | Counterclockwise | Rotate counterclockwise |
| C < C' | Rotating Gesture | Clockwise | Rotate clockwise |
| E > E' | Rotating Gesture | Counterclockwise | Rotate counterclockwise |
| E < E' | Rotating Gesture | Clockwise | Rotate clockwise |

FIG. 9

METHODS FOR IMPLEMENTING MULTI-TOUCH GESTURES ON A SINGLE-TOUCH TOUCH SURFACE

FIELD OF THE INVENTION

The present invention relates generally to user interface systems for computing systems, and more particularly to gesturing using touch sensitive user interface surfaces.

BACKGROUND

Multi-touch interactions with computing devices have received considerable attention in the recent years. Today, multi-touch touch sensitive devices are found in many portable computing devices such as Personal Digital Assistants (PDA) and laptop computers. These touch sensitive devices allow users to employ multi-touch gestures to perform functions such as zooming or rotating a display image. There are, however, many disadvantages with the currently available multi-touch compatible touch sensitive devices. For instance, touch sensitive devices capable of recognizing multi-touch gestures require special technology and hardware, which is currently expensive to manufacture and implement. Additionally, this special technology is incompatible with many currently available touch surface devices that are used in a majority of computing devices. As a result, because the currently available multi-touch technology is new and costly, the majority of the computing devices already in the market do not possess multi-touch capabilities.

SUMMARY

The various aspects include methods for implementing a multi-touch gesture on a computing device having a touch surface user input device that include detecting a first touch event on the touch surface, storing a location of the first touch event on the touch surface, detecting a jump in location of the touch event on the touch surface without detecting a touch-up event, storing a location of the touch event following the detected jump, obtaining a new touch event location, determining a graphical user interface function to be implemented based on the stored location of the first touch event, the stored location of the touch event following the detected jump, and the new touch event location, and implementing the determined graphical user interface function.

In various aspects of the methods, the determined graphical user interface function may be a transform function, an image zoom transform function, and an image rotation transform function, for example. In aspects where the determined graphical user interface function is a transform function, the method further may further include determining a transform factor based on the stored location of the first touch event, the stored location of the touch event following the detected jump, and the new touch event location. In aspects where the determined graphical user interface function is an image zoom transform function, and the method further may further include determining a magnification transform factor based on the stored location of the first touch event, the stored location of the touch event following the detected jump, and the new touch event location, in which implementing the determined graphical user interface function comprises applying a zoom magnification to a displayed image based upon the determined magnification transform factor. In aspects where the determined graphical user interface function is an image rotation transform function, and the method may further include determining a rotation transform factor based on the stored location of the first touch event, the stored location of the touch event following the detected jump, and the new touch event location, in which implementing the determined graphical user interface function comprises rotating a displayed image based upon the determined rotation transform factor.

In various aspects of the methods, determining a graphical user interface function to be implemented based on the stored location of the first touch event, the stored location of the touch event following the detected jump, and the new touch event location may be accomplished in a variety of ways. In an aspect, determining a graphical user interface function to be implemented based on the stored location of the first touch event, the stored location of the touch event following the detected jump, and the new touch event location may include calculating a difference between a distance from the stored location of the first touch event to the stored location of the touch event following the detected jump and a distance from the stored location of the first touch event to the new touch event location. In an aspect, determining a graphical user interface function to be implemented based on the stored location of the first touch event, the stored location of the touch event following the detected jump, and the new touch event location may include calculating an angle between a line from the stored location of the first touch event to the stored location of the touch event following the detected jump and a line from the stored location of the first touch event to the new touch event location. In a further aspect, determining a graphical user interface function to be implemented based on the stored location of the first touch event, the stored location of the touch event following the detected jump, and the new touch event location may include calculating a difference between a distance from the stored location of the first touch event to the stored location of the touch event following the detected jump and a distance from the stored location of the first touch event to the new touch event location, and calculating an angle between a line from the stored location of the first touch event to the stored location of the touch event following the detected jump and a line from the stored location of the first touch event to the new touch event location. In further aspects, determining a graphical user interface function to be implemented based on the stored location of the first touch event, the stored location of the touch event following the detected jump, and the new touch event location may be performed by an operating system or by an application programming interface (API). In a further aspect, determining a graphical user interface function to be implemented based on the stored location of the first touch event, the stored location of the touch event following the detected jump, and the new touch event location may include estimating a touch location of a second touch based on the stored location of the first touch event and the stored location of touch event following the detected jump. In a further aspect, determining a graphical user interface function to be implemented based on the stored location of the first touch event, the stored location of the touch event following the detected jump, and the new touch event location may include calculating a first distance from the stored location of the first touch event to the stored location of touch event following the detected jump, calculating a second distance from the stored location of the first touch event to the new touch event location, determining if the first distance is different from the second distance, determining that the graphical user interface function is a zoom transform function if the first and second distances are different, and calculating a magnification transform factor based on a ratio of the second distance to the first distance, in which implementing the determined graphical user interface function comprises applying a zoom magnification to a displayed image based upon the calculated magnification transform factor. In a further aspect, determining a graphical user interface function to be implemented based on the stored location of the first touch event, the stored location of the touch event following the detected jump, and the new touch event location may include calculating a first distance from the stored location of the first touch event to a second touch location based on the distance from the stored location of the first touch to the stored location of touch event following the detected jump, calculating a second distance from the stored location of the first touch event to a new second touch location based on the distance from the stored location of the first touch to the new touch event location, determining if the first distance is different from the second distance, determining that the graphical user interface function is a zoom transform function if the first and second distances are different, and calculating a magnification transform factor based on a ratio of the second distance to the first distance, in which implementing the determined graphical user interface function comprises applying a zoom magnification to a displayed image based upon the calculated magnification transform factor.

In a further aspect, a computing device includes a processor, a user interface touch surface device coupled to the processor, a memory coupled to the processor, a display coupled to the processor, in which the processor is configured with processor-executable instructions to perform processes of the various aspect methods.

In a further aspect, a computing device includes means for accomplishing the process functions of the various aspect methods.

In a further aspect, a computer program product includes a computer-readable medium having stored thereon at least one instruction for accomplishing the processes of the various aspect methods.

BRIEF DESCRIPTION OF THE DRAWINGS

The accompanying drawings, which are incorporated herein and constitute part of this specification, illustrate exemplary aspects of the invention. Together with the general description given above and the detailed description given below, the drawings serve to explain features of the invention.

FIG. 9 is a data table linking the touch event parameters and gesture types to functionalities according to an aspect.

DETAILED DESCRIPTION

Figure 1:
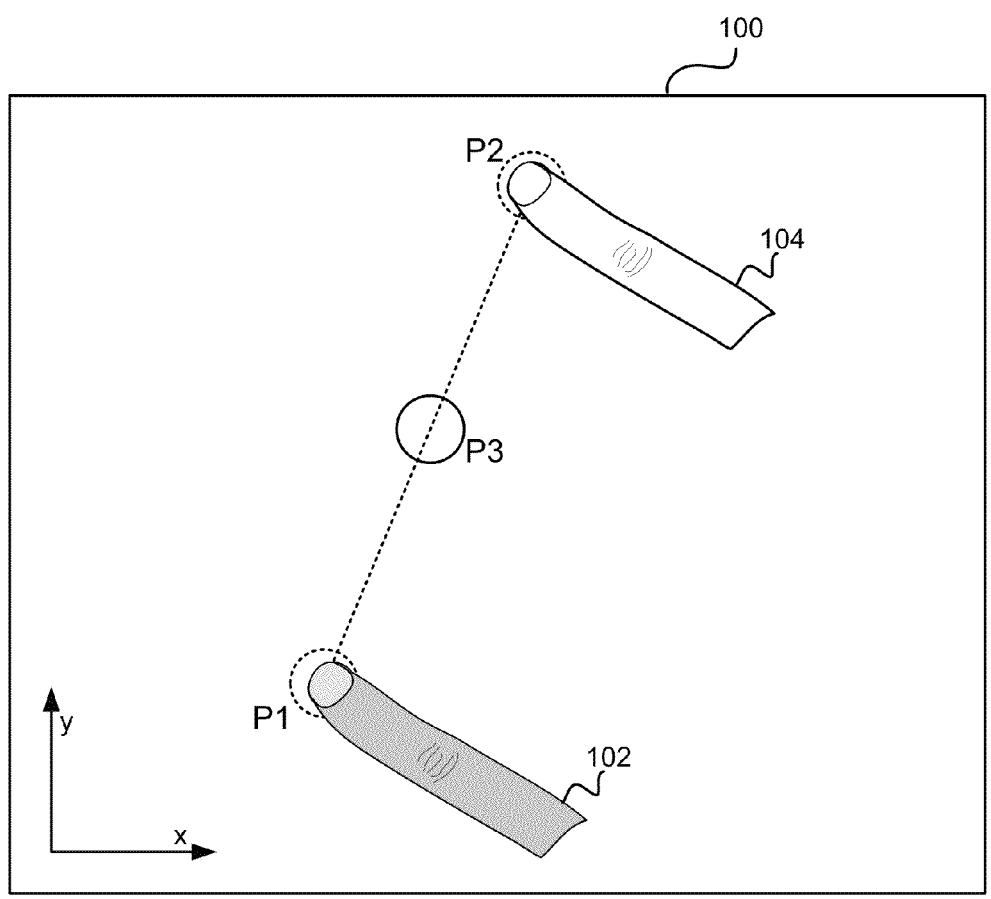
FIG. 1 is a frontal view of a mobile device illustrating processing of a multi-touch gesture on a non-multi-touch touch surface input device.

The various aspects will be described in detail with reference to the accompanying drawings. Wherever possible, the same reference numbers will be used throughout the drawings to refer to the same or like parts. References made to particular examples and implementations are for illustrative purposes and are not intended to limit the scope of the invention or the claims.

The word "exemplary" is used herein to mean "serving as an example, instance, or illustration." Any implementation described herein as "exemplary" is not necessarily to be construed as preferred or advantageous over other implementations.

As used herein, a "touchscreen" is a touch sensing input device or a touch sensitive input device with an associated image display. As used herein, a "touchpad" is a touch sensing input device without an associated image display. A touchpad, for example, can be implemented on any surface of an electronic device outside the image display area. Touchscreens and touchpads are generically referred to herein as a "touch surface." Touch surfaces may be integral parts of an electronic device, such as a touchscreen display, or may be a separate module, such as a touchpad, that can be coupled to the electronic device by a wired or wireless data link. The terms touchscreen, touchpad, and touch surface may be used interchangeably hereinafter.

As used herein, the terms "personal electronic device," "computing device" and "portable computing device" refer to any one or all of cellular telephones, personal data assistants (PDAs), palm-top computers, notebook computers, personal computers, wireless electronic mail receivers, and cellular telephone receivers (e.g., the Blackberry® and Treo® devices), multimedia Internet enabled cellular telephones (e.g., the Blackberry Storm®), and similar electronic devices that include a programmable processor, memory, and a connected or integral touch surface or other pointing device (e.g., a computer mouse). In an example used to illustrate various aspects of the present invention, the electronic device is a cellular telephone including an integral touchscreen display. However, this aspect is present merely as one example implementation of the various aspects, and as such is not intended to exclude other possible implementations of the subject matter recited in the claims.

As used herein a "touch event" refers to a detected user input on a touch surface that may include information regarding location or relative location of the touch. For example, on a touchscreen or touchpad user interface device, a touch event refers to the detection of a user touching the device and may include information regarding the location on the device being touched.

The currently available multi-touch technology is uniquely available on computing devices which employ a special and costly type of multi-touch capable touch sensitive device. Today, in order to implement multi-touch gestures, users must abandon their non-multi-touch computing devices and purchase new, expensive computing devices equipped with multi-touch capable touch sensitive device.

The various aspect methods and systems provide a user interface system that recognizes multi-touch gestures on any touch sensitive device, thereby enabling non-multi-touch sensitive devices to support multi-touch gestures. The methods of the various aspects may be implemented in many computing device equipped with non-multitouch touch sensitive devices. Further, the various aspects may be implemented in current non-multi-touch computing devices through a simple software upgrade.

The currently available non-multi-touch devices possess certain limitations that preclude conventions multi-touch interactions. When a user touches the surface of a non-multi-touch computing device using two fingers, the two (or more) touch locations are averaged to indicate a single touch location. As a result, all multi-touch events are interpreted as single-touch events with the coordinates of the averaged touch locations.

FIG. 1 illustrates a non-multi-touch touch surface 100 that is being touched by two fingers 102, 104. In this illustration, it is assumed that one finger 102 touches the touch surface 100 first at P1, followed by the second finger 104 touching the touch surface 100 at P2. The first touch location P1 is at touch surface coordinates (X1, Y1), and the second touch location P2 is at touch surface coordinates (X2, Y2). As soon as the second finger 104 touches the surface of the touch surface 100, the touch surface 100 (e.g., the touch surface hardware and its driver software) will report a single virtual touch P3 at coordinates (X3, Y3), which represents an average of the two actual touch locations P1 and P2. Thus, a conventional computing device would treat the multi-touch event as a single-touch event by only recognizing the coordinates of P3, being unable to locate the actual touches at P1 and P2. While this behavior prevents conventional non-multitouch computing devices from recognizing standard multi-touch gestures, the behavior can be leveraged to enable the multi-touch gestures of the present invention. Specifically, when a user touches with a first finger 102, the touch surface records the first location P1, but when the user touches with the second FIG. 104, the touch location jumps suddenly to virtual touch location P3 without a touch-up event. The various aspects recognize this particular behavior as indicating a multi-touch event, and use the known first touch location P1 and the virtual touch location P3, or an extrapolated actual second touch location P2, to determine a graphical user interface function that should be implemented.

To activate multi-touch graphical user interface functionalities (e.g., zooming or rotating), the processor of a computing device according to the various aspects may be programmed with processor-executable instructions to recognize the touch pattern described above and treat the touch patterns as multi-touch gestures. According to the various aspects, in order to perform multi-touch gestures on non-multi-touch touch surfaces 100 using two fingers, users are required to touch the touch surface 100 first with one finger 102 followed by a touch by a second finger 104. The computing device may be configured to detect and store the coordinates of the first touch (P1), recognize a sudden jump in touch location to an averaged virtual touch coordinates (P3) (e.g., a sudden movement without a touchup event) and based on the coordinates of the virtual touch P3, calculate the coordinates of the second touch (P2). In performing a multi-touch gesture according to the various aspects, the user should keep the first finger 102 essentially stationary and in contact with the touch surface 100 while moving the second finger 104. Keeping the first finger 102 stationary at all times allows the computing device to calculate changes in the position of the second finger at P2 based upon the sensed position of the virtual touch at P3. By presuming that the first touch location P1 is not moving, the computing device can identify the performed multi-touch gesture and implement the appropriate multi-touch gesture function.

For example, to perform a pinch gesture for applying a zoom-out (i.e., shrink) function to the display image, a user may first touch the touch surface 100 with one finger 102 followed by a second finger 104 a short distance apart. To perform a graphical user interface zoom-in function, the user may keep the first finger 102 stationary and move the second finger 104 away from the first finger 102 in a pinching gesture that increases the distance between the first and second fingers 102, 104. Similarly, to perform a rotation function, the user may keep the first finger 102 stationary and move the second finger 104 as though following the circumference of a circle, the center of which is defined by the location of the first finger 102 at P1. Moving the second finger 104 through an arch with respect to the first finger 102 in a clockwise direction may be interpreted as multi-touch gesture that the computing device implements to rotate the display image in a clockwise direction. Similarly, moving the second finger 104 in a counterclockwise direction may cause the computing device to rotate the display image in a counterclockwise direction.

Figure 2:
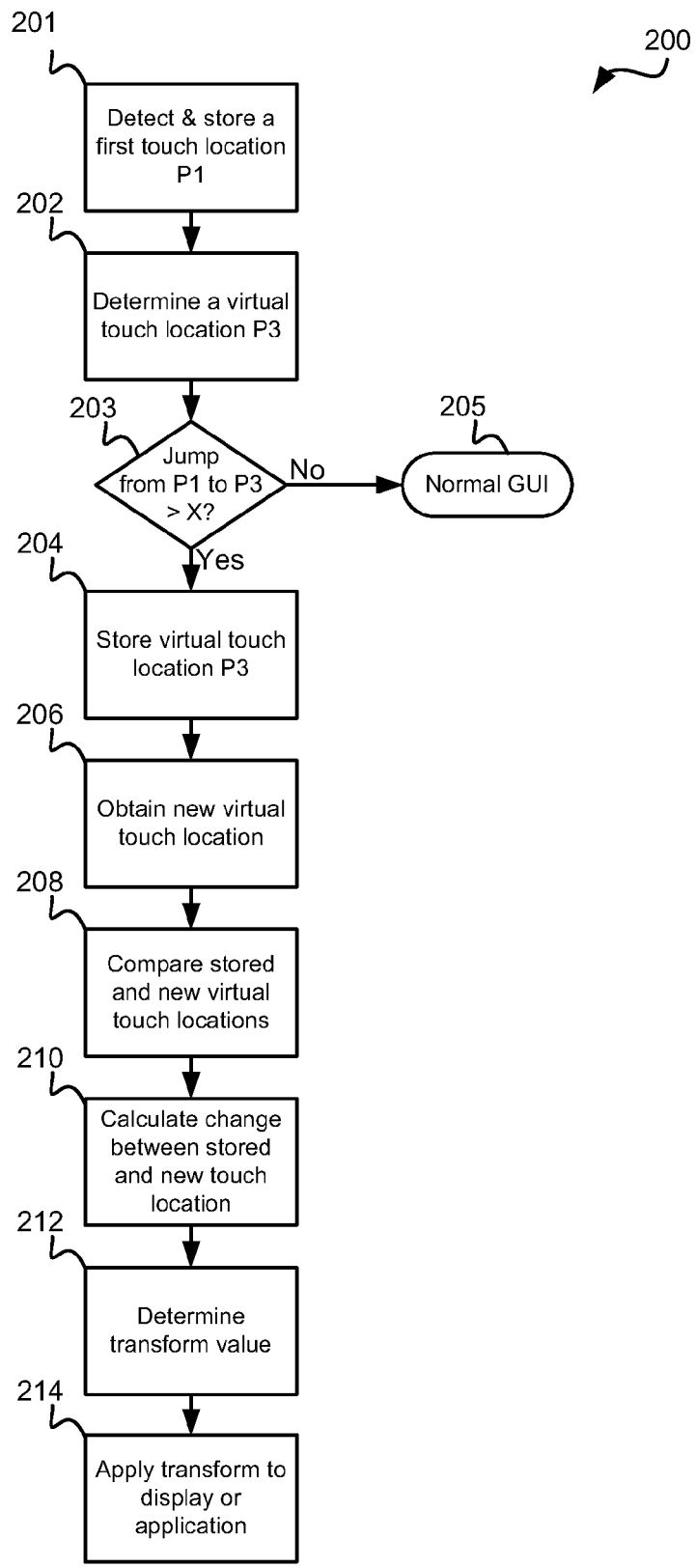
FIG. 2 is a process flow diagram of an example method for implementing the multi-touch gestures of the various aspects.

The various aspect methods overcome the technological limitations presented to the non-multi-touch computing devices and enable them to recognize and process multi-touch gestures as graphical user interface commands. Accordingly, the various aspect methods may be implemented on all computing devices equipped with a touch surface 100 by implementing method 200 illustrated in FIG. 2. In method 200 at block 201, computing devices may detect a first touch by a first finger 102 and store the coordinates of the first touch location in memory. At block 202, computing devices may detect a virtual touch location when a second finger 104 touches the touch surface 100, and determine that the touch surface touch locations jumped suddenly from the location of the first touch event to the location of the virtual touch event (i.e., from P1 to P3) at determination block 203. Computing devices may be configured to activate multi-touch functionality based on the parameters of the jump in the touch event locations. The distance of the jump may be calculated based on the distance between the first touch event and the virtual touch event. Mathematical formulae that may be used to calculate the distance of the jump are described in detail below with respect to FIG. 6. To distinguish normal tracing of a finger on the touch surface, the computing device may determine whether the calculated distance of the jump in touch event locations is larger than a predetermined threshold distance "X" at determination block 203. If the distance of the instantaneous jump is less than the threshold distance (i.e., determination block 203="No"), the multi-touch gesture functionality is not used and normal graphical user interface processing of the touch event may be implemented. If the distance of the instantaneous jump equals or exceeds the threshold distance (i.e., determination block 203="Yes"), the computing device may activate the multi-touch functionality and store the virtual touch location P3 in memory at block 204.

Detecting a multi-touch event based on a sudden jump in position of the touch location is just one example method that may be implemented. In another aspect, the computing device may be configured to detect the presence of two finger touches on the touch surface based upon other measurable parameters, such as the total amount of surface area touched, touch locations in two different zones within the touch surface, total capacitance or resistance measured by the touch surface, or other mechanism or measurement that may be available to the touch surface. Such alternative mechanisms for detecting a multi-touch event may take the place of determination block 203 in FIG. 2.

When the user moves the second finger 104 on the touch surface, the coordinates of the averaged virtual touch location P3 will change correspondingly. At block 206 the computing device may be configured to obtain the next new virtual touch location (i.e., in the next touch surface refresh), and compare the new virtual touch location to the stored P3 coordinates at block 208. At block 210, the computing device may calculate the change in the location of the current touch event from the stored virtual touch coordinates, and determine an appropriate graphical user interface function that is to be performed at block 212. For example, the graphical user interface function may be a function to transform a displayed image by a determined transform factor. Examples of graphical user interface transform functions that may be applied include zooming in (i.e., magnifying) an image by a determined amount, zooming out (i.e., de-magnifying) an image by a determined amount, rotating clockwise or counterclockwise by a determined number of degrees, and scanning left, right, up or down by a determined amount. At block 214, the computing device may then apply the determined graphical user interface function, such as transforming the displayed image or providing a user input to an open application at block 214. The determined graphical user interface function may vary depending upon the application. For example, the same multi-touch gesture may be related to graphical user interface function that zooms out of an image in a map application, and causes acceleration of a virtual vehicle in a gaming application.

The computing devices of the various aspects may be configured to recognize and process different types of multi-touch gestures as graphical user interface functions. Two commonly used graphical user interface multi-touch gestures include pinch and rotation gestures. The pinch gesture may be associated with a graphical user interface zooming function enabling users to zoom in or out of an image, a file or an application. The rotation gesture may be associated with a graphical user interface rotating function enabling users to rotate images clockwise or counterclockwise, or as a rotational user input as may be understood by game applications.

In some aspects, the multi-touch gesture functionalities may be automatically disabled by an application that employs user interface gestures that might be confused with the multi-touch gestures. In a further aspect, a user may be able to activate and deactivate multi-touch gesture functionalities as part of device user settings based upon a user input (e.g., activation of a virtual button and a configuration menu).

In some aspects, the multi-touch gestures may be manually enabled. To manually enable or activate the multi-touch gestures in an application, a user may select and activate the multi-touch gesture by pressing a button or by activating an icon on a GUI display. For example, the index operation may be assigned to a soft key, which the user may activate (e.g., by pressing or clicking) to launch the multi-touch gesture functionalities. As another example, the multi-touch gesture functionality may be activated by a user command. For example, the user may use a voice command such as "activate index" to enable the multi-touch gesture functionalities. Once activated, the multi-touch gesture functionalities may be used in the manner described herein.

The multi-touch gesture functionalities may be implemented on any touch surface 100. A touchscreen display is a particularly useful implementation, given that touchscreens can present a display image that can be manipulated using the multi-touch gestures. In such applications, the user can interact with an image by touching the touchscreen display with two fingers.

When a multi-touch gesture (i.e., the touch of two fingers on the touch surface) is detected, a linked graphical user interface function or gesture function may be activated. The graphical user interface functions linked to, or associated with, the multi-touch gestures may be established in the graphical user interface of the computing device, defined by an application, and/or set by user preference settings. Some example of such multi-touch gesture graphical user interface functions, and may include zooming or rotating display images as described herein. For example, if the linked function is defined as a zooming function, the computing device processor may zoom in to or out of a display image in response to the user tracing a pinch gesture that satisfies the required parameters.

Figure 3A:
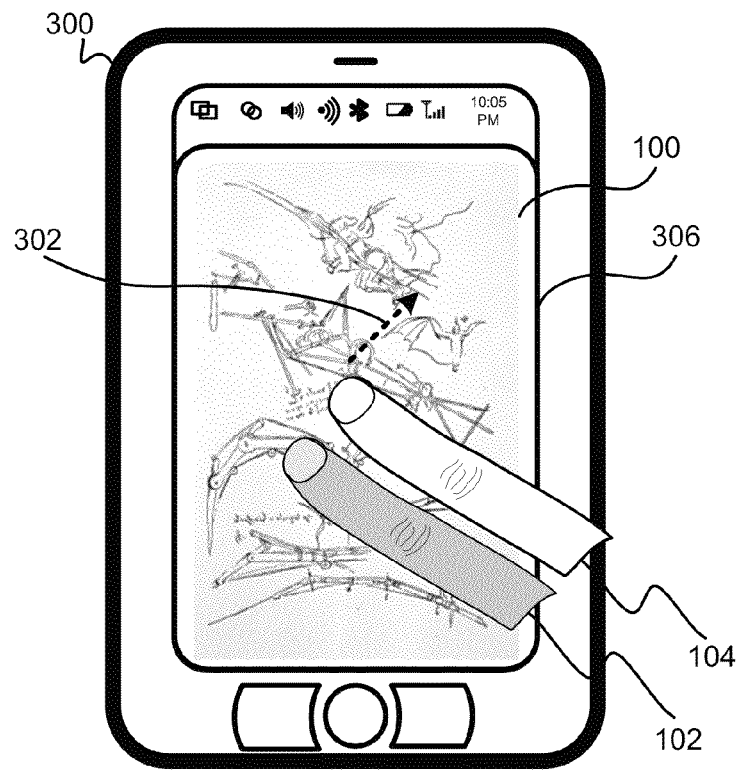
FIGS. 3A and 3B are frontal views of a computing device illustrating a pinch gesture functionality activated to zoom in to the display image according to an aspect.

FIG. 3A illustrates the zoom-in functionality as a user performs a pinching out gesture on the touch surface 100 of a computing device 300. To initiate the multi-touch gesture, the user may touch the touch surface 100 with a first finger 102 followed a short time later by the touch of a second finger 104. To trace a pinching-out gesture to zoom-in on the image in the display 306, the user keeps the first finger 102 stationary and moves the second finger 104 away from the first finger 102 (as illustrated by the dotted line and arrow 302). This dotted line and arrow 302 is for illustrative purposes to show the direction that the second finger 104 may move to trace the pinching out gesture, and does not appear on the display according to this aspect.

Figure 3B:
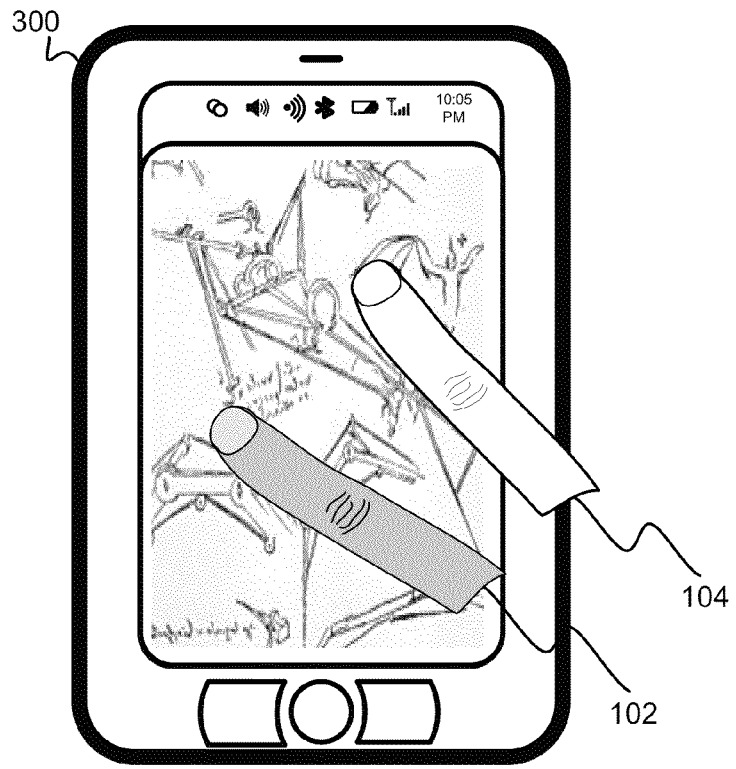

FIG. 3B illustrates the computing device 300 after the user completes the pinching out gesture, in which the computing device 300 has interpreted this multi-touch gesture as a zoom-in function and applied it to the display image by enlarging it.

Figure 4A:
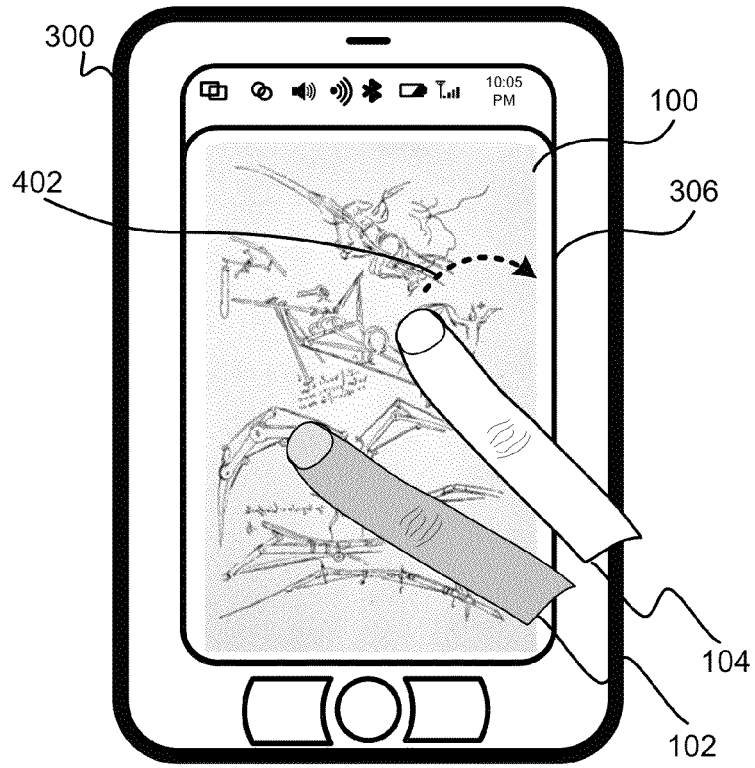
FIGS. 4A and 4B are frontal views of a computing device illustrating a rotating gesture functionality activated to rotate the display image according to an aspect.
Figure 4B:
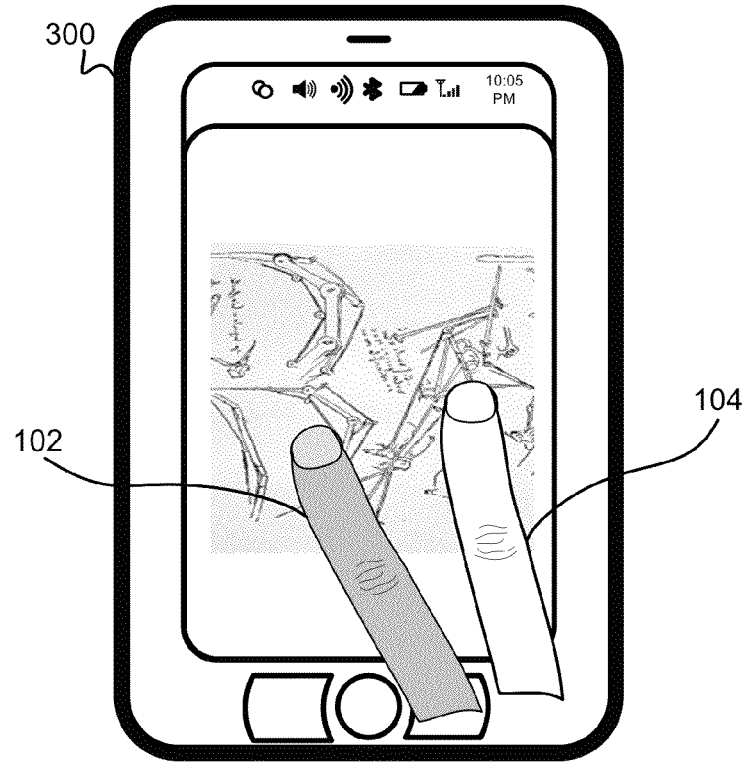

FIG. 4A illustrates a rotation functionality multi-touch gesture. As with the various aspects, to initiate the multi-touch gesture, the user may touch the touch surface 100 with a first finger 102 followed a short time later by the touch of a second finger 104. The user may keep the first finger 102 stationary and rotate the second finger 104 in a clockwise direction to rotate the display image in a clockwise direction. The dotted curved line and arrow 402 shows the direction in which the second finger 104 may rotate. The computing device 300 may recognize the gesture as a rotation gesture and rotate the display image in a clockwise direction, as illustrated in FIG. 4B.

Figure 5A:
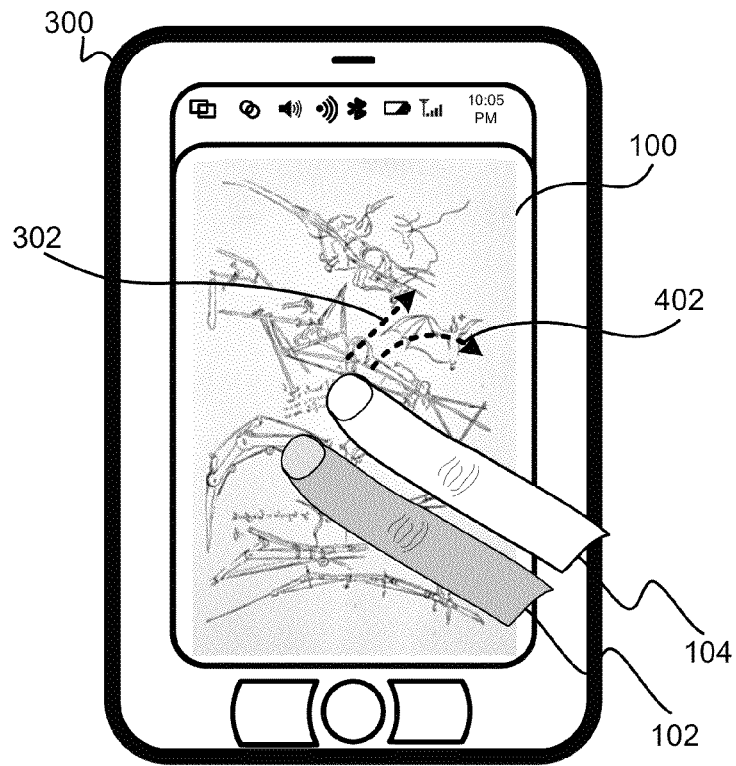
FIGS. 5A and 5B are frontal views of a computing device illustrating zooming and rotating gesture functionalities according to an aspect.
Figure 5B:
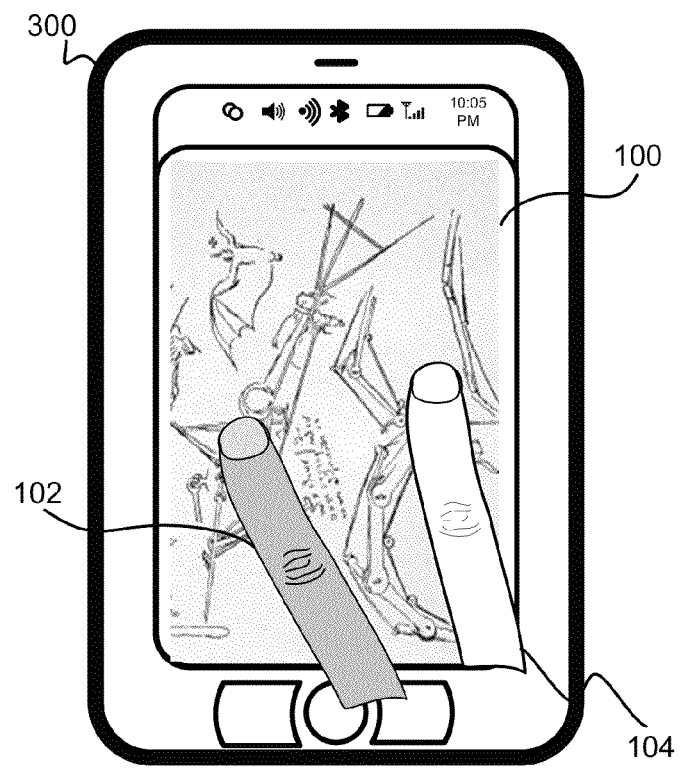

As illustrated in FIGS. 5A and 5B, the computing device 300 may be configured to recognize and process more than one gesture at a time according to an aspect. For example, a user may use his fingers to trace both a pinch gesture and a rotation gesture by keeping the first finger 102 stationary on the touch surface 100, moving the second finger 104 away from the first finger 102 in the direction of the dotted line and arrow 302, and rotating the second finger 104 clockwise in the direction of the dotted curve and arrow 402. The dotted line and arrow 302, and dotted curve and arrow 402 are shown for illustration purposes only and are not part of the display for according to this aspect. The computing device 300 may be configured to recognize these gestures and zoom-in to the displayed image while rotating the image in a clockwise direction.

The computing devices 300 may be configured to perform certain mathematical calculations to recognize and process the multi-touch gestures of the various aspects. Different mathematical formulae may be used in determining the appropriate graphical user interface effects of different multi-touch gestures as they are performed by the user on touch surfaces 100 of computing devices 300. Exemplary mathematical formulae are discussed below with reference to FIGS. 6-7.

Figure 6:
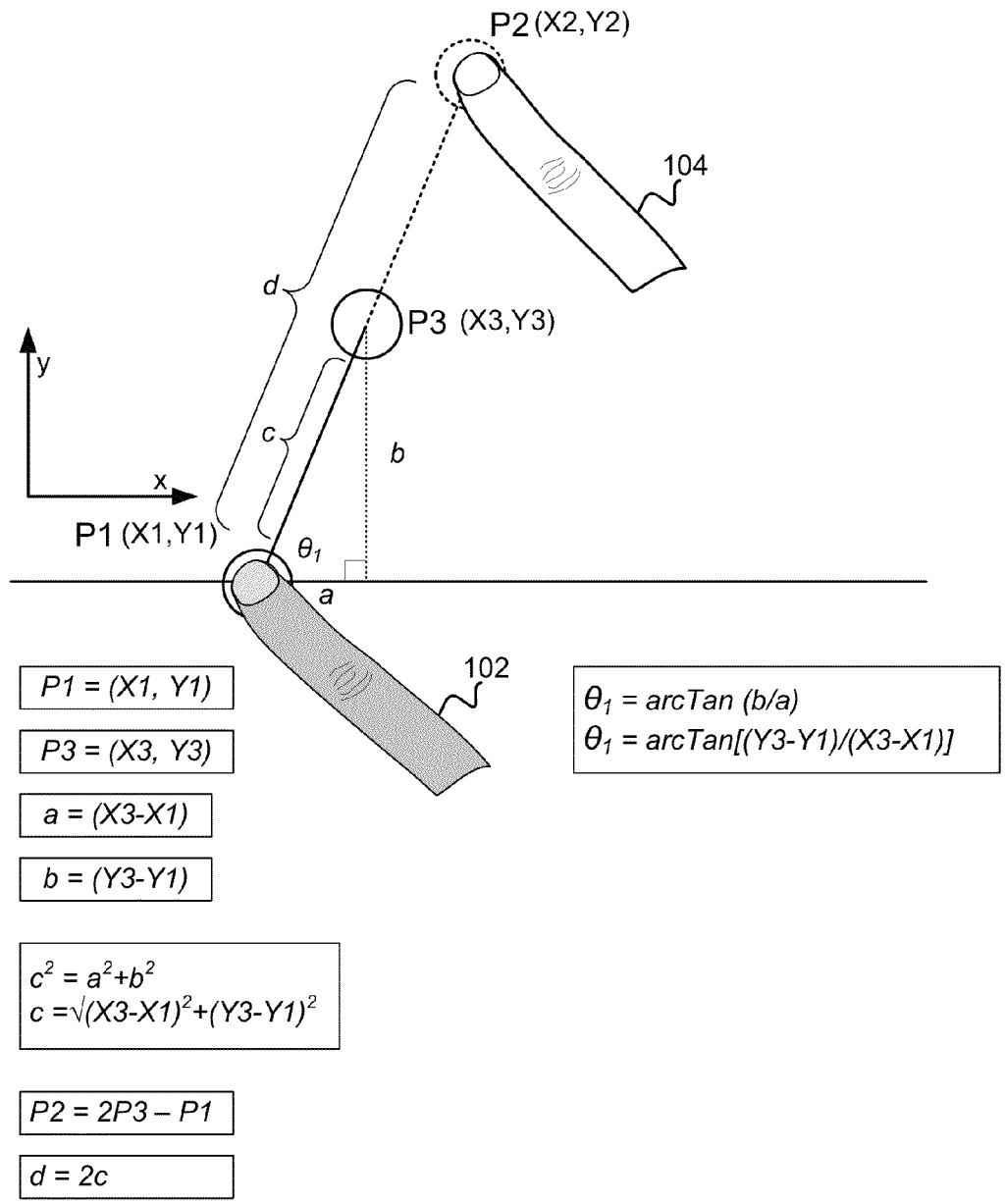
FIG. 6 is a frontal view of a non-multi-touch surface touch input device illustrating a multi-touch gesture and calculations based on the coordinates of the first touch event and the averaged virtual touch events according to various aspects.

Some calculations that may be performed when a computing device detects a multi-touch gesture on a non-multi-touch surface are illustrated in FIG. 6. As described above, when a user touches the touch surface 100, the computing device 300 may detect the first touch event P1 and store the coordinates (X, Y) of the first touch in the memory. When the user touches the touch surface a second time at point P2 (with coordinates X2, Y2), the computing device 300 will detect that the touch surfaces being touched at a single point P3 (with coordinates X3, Y3).

The computing device 300 may be configured to calculate the actual coordinates of P2, and the distance between P1 and P2 (i.e., distance d), or the distance between P1 and P3 (i.e., distance c) using the P1 and P3 coordinates. The following mathematical formula may be used to determine the location of P2 using the known coordinates of P1 (X1,Y1) and P3 (X3, Y3):

$$P2 = (2*P3) - P1$$

$$P2 = ((2X3-X1), (2Y3-Y1)) \quad \text{Formula 1}$$

Using the P1 and P3 coordinates (i.e., (X1, Y1) and (X3, Y3)), the computing device 300 may also calculate the distance between each touch location P1 and P3 (i.e., distance c), and P1 and P2 (i.e., distance d). The following mathematical formula may be used to calculate the distance c:

$$c^2 = a^2 + b^2 \quad \text{Formula 2}$$

where,
a=(X3−X1), and
b=(Y3−Y1)
resulting in $$c = \sqrt{(X3-X1)^2 + (Y3-Y1)^2}$$

The distance d may be calculated using the following mathematical formula:

$$d = 2c \quad \text{Formula 3}$$

Another parameter that may be calculated using the P1 and P3 coordinates is the angle $\theta_1$ by using the following mathematical formula:

$$\theta_1 = \text{arc Tan}(b/a) \quad \text{Formula 4}$$

where
a=(X3−X1), and
b=(Y3−Y1)
resulting in $$\theta_1 = \text{arc Tan}[(Y3-Y1)/(X3-X1)]$$

The parameters calculated based on these mathematical formulae may be used to determine the graphical user interface function indicated by a multi-touch gesture, as well as a magnitude to apply in the function (e.g., a zoom factor). For example, depending upon the current application and the nature of the media being displayed, if the distance between P1 and P3 increases (i.e., increase in length of c), this may indicate that a pinching gesture is being traced to zoom-in to the displayed image. If the coordinates of P3 change consistent with a counterclockwise movement of the second finger 104 with respect to the first finger 102, this may indicate that a rotating gesture is being traced to rotate the display image in a counterclockwise direction.

Figure 7B:
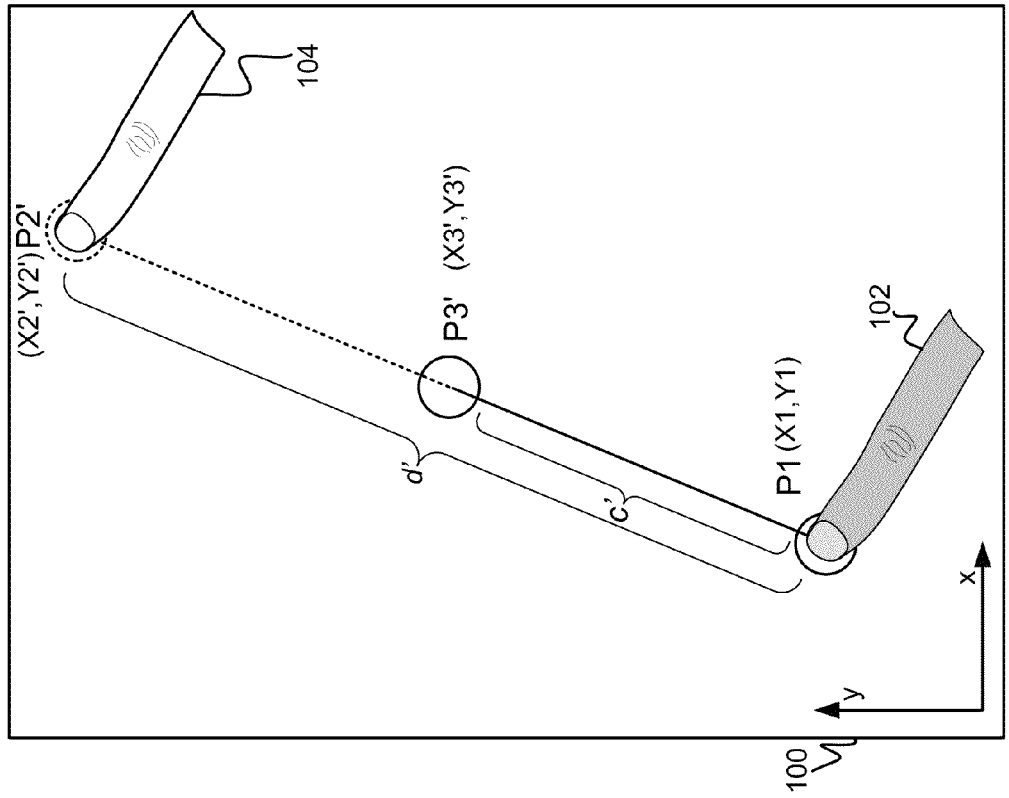
FIGS. 7A and 7B are frontal views of a non-multi-touch surface touch input device illustrating a pinching gesture according to an aspect.
Figure 7A:
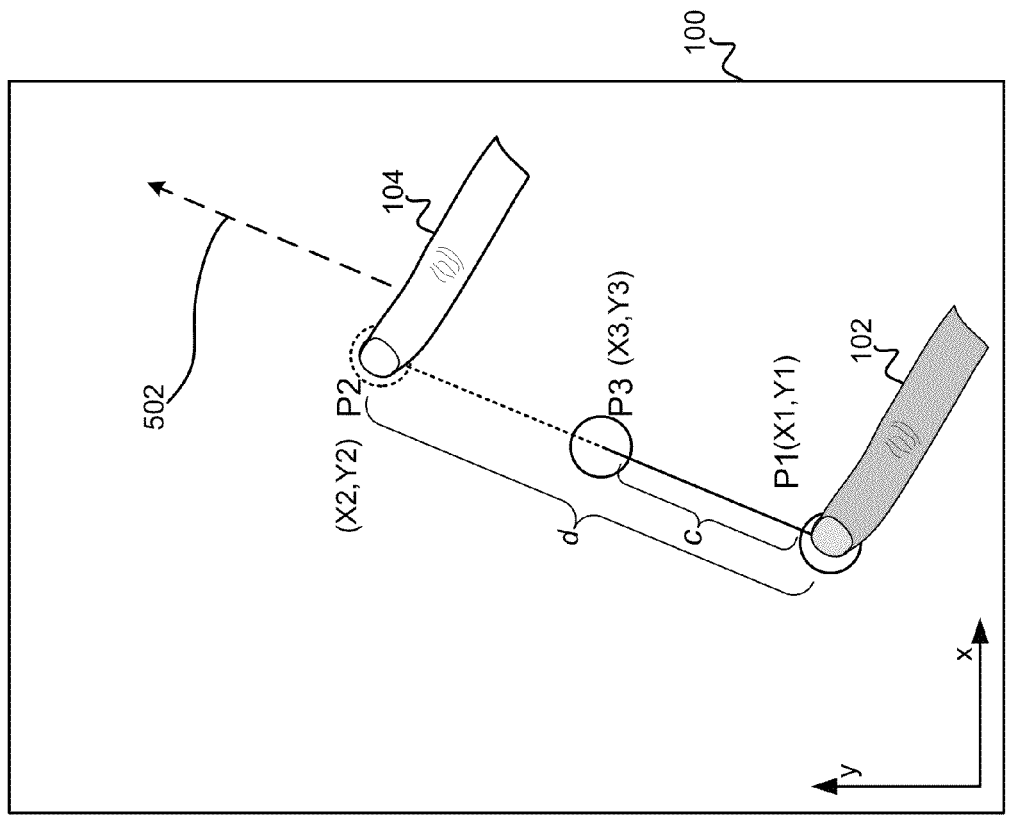

FIGS. 7A and 7B illustrate an aspect method for detecting a multi-touch pinching gesture using a touch surface 100. As illustrated in FIG. 7A, when the user touches the touch surface a second time at point P2 (with coordinates X2, Y2), the computing device 300 will detect that the touch surfaces being touched at a single point P3 (with coordinates X3, Y3). Using the formulas 1-4 described above, the computing device 300 may determine the coordinates of the P2 touch and calculate the distance d from the first touch location P1, and the distance c from the first touch location P1 to the reported virtual touch location P3. The user may trace a gesture by moving the second finger 104 in the direction of the dotted line and arrow 502, away from the first finger 102 to a new location on the touch surface 100.

The computing device 300 will detect that the touch surface is being touched at virtual touch location P3', as illustrated in FIG. 7B. Using the new P3' coordinates, the computing device may determine the location of the second finger touch P2', and calculate the distance between P1 and P3' (i.e., c'), or between P1 and P2' (i.e., d').

The computing device 300 may determine that the user traced a pinching gesture by determining whether there has been a change in distance between P1 stored in memory and P3 as indicated by the touch surface (i.e., the distance from c to c'), or between P1 and P2 (i.e., the distance from d to d'). If the distance between P1 and P3 has increased (i.e., c'>c), the computing device 300 may determine that the user is tracing a pinching-out gesture. However, if the distance between P1 and P3 has decreased (i.e., c'<c), the computing device 300 may determine that the user is tracing a pinching-in gesture. The computing device 300 may use the mathematical formula 5 to make this determination by calculating the difference between c and c'.

Similarly, if the distance between P1 stored in memory and P2 as calculated based upon the current P3 has increased (i.e., d'>d), the computing device 300 may determine that the user is tracing a pinching-out gesture. However, if the distance between P1 and P2 has decreased (i.e., d'<d), the computing device 300 may determine that the user is tracing a pinching-in gesture.

It should be noted that while the computing device can calculate the location of the second finger touch (i.e., P2), this calculation is not necessary because the multi-touch gestures can be recognized and implemented based solely on the recorded first touch location P1 and the currently measured touch location P3. The change in distance from P1 to P3 will be half that of the change in distance from P1 to P2. So, for pinch-type graphical user interface gestures, the transform factor (which is based upon the distance that the two fingers move towards or away from each other) must be increased by a factor of two. However, no adjustment is required for rotational type graphical user interface gestures.

Once the distances c and c', or d and d' are calculated, the computing device 300 may calculate the differences between c and c', or d and d' by using the mathematical formula 5. The calculated differences may later be used to determine the transform factors based on which the display image may be transformed. The transform factors are described in more detail below.

$$\Delta = c' - c, \text{ or}$$

$$\Delta = d' - d \qquad \text{Formulae 5}$$

Figure 8:
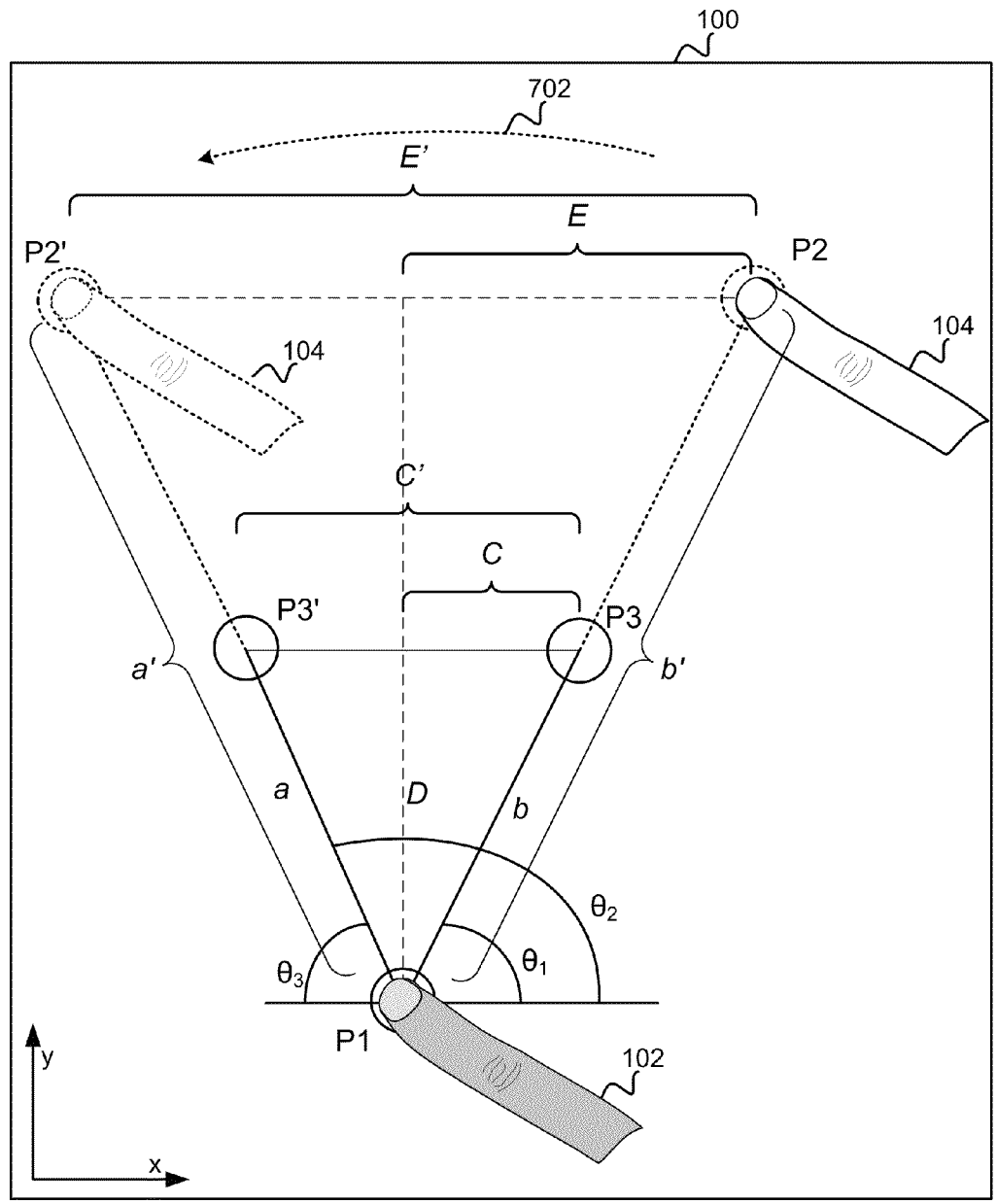
FIG. 8 is a frontal view of a non-multi-touch surface touch input device illustrating a rotating gesture according to an aspect.

FIG. 8 illustrates an aspect method for detecting a multi-touch rotating gesture using a computing device 300 equipped with a touch surface 100. When the user touches the touch surface a second time at point P2 (with coordinates X2, Y2), the computing device 300 will detect that the touch surfaces being touched at a single point P3 (with coordinates X3, Y3). Based on the initial multi-touch touch events, the computing device may be configured to determine the coordinates of the P2 touch event and calculate $\theta_1$, C and E using the formulae 1-4 described above with respect to FIG. 6. The user may then trace a rotating gesture by moving the second finger 104 in a clockwise or counterclockwise direction. In this aspect, the user is moving the second finger 104 in a counterclockwise direction as shown by the dotted line and arrow 702.

In determining whether the traced movement is a rotating gesture, the computing device 300 may calculate the angle subtended by the movement from P3 and P3' by calculating the angle D, by determining the distance between P2 and P2' (i.e. distance E) or by determining the distance between P3 and P3' (i.e., distance C' along the horizontal axis (i.e., the X axis). Any change in the value of D or a change in the distances C or E may signify tracing of a rotating gesture.

The angle D may be calculated using the following mathematical formula:

$$D = \theta_2 - \theta_1, \qquad \text{Formula 6}$$

where
$\theta_2 = 180 - \theta_3$,
and where $$\theta_3 = \text{arc Tan }[(Y3'-Y1)/(X3'-X1)]$$

The computing device 300 may also be configured to determine the distance traveled between the virtual touch events P3 and P3' (i.e., distance C'), and to calculate the change between C and C'. The distance C' may be calculated using the following mathematical formula:

$$C'^2 = a^2 + b^2 - (2ab^* \cos D), \qquad \text{Formula 7}$$

where
$a = \sqrt{(X3'-X1)^2 + (Y3'-Y1)^2}$, and
$b = \sqrt{(X3-X1)^2 + (Y3-Y1)^2}$ The change in the distance between C and C' may be calculated using the following mathematical formula:

$$\Delta = C' - C \qquad \text{Formula 8}$$

where
$C = \sqrt{(X3-X1)^2 + (Y3-Y1)^2}$

The distance that the second finger 104 has traveled from P2 to P2' (i.e., distance E') along the X axis may also be calculated. The change in the distance between E and E' may also be calculated using the following mathematical formula:

$$\Delta = E' - E \qquad \text{Formula 9}$$

where,
$E = \sqrt{(X2-X1)^2 + (Y2-Y1)^2}$, and $$E'^2 = a^2 + b^2 - (2ab^* \cos D)$$

where,
$a = \sqrt{(X3'-X1)^2 + (Y3'-Y1)^2}$, and
$b = \sqrt{(X3-X1)^2 + (Y3-Y1)^2}$
alternatively, E' may be calculated using:

$$E'^2 = a'^2 + b'^2 - (2a'b'^* \cos D)$$

where
$a' = \sqrt{(X2'-X1)^2 + (Y2'-Y1)^2}$, and
$b' = \sqrt{(X2-X1)^2 + (Y2-Y1)^2}$ The results of the calculations (i.e., calculating the angle D or the change in the distances C to C' or E to E') may be used to determine a transform factor to be applied to the displayed. Transform factors are discussed in more detail below.

The computing device 300 may also be configured to determine the up and down, and clockwise and counterclockwise directions of a traced gesture using the calculated parameters based on the above formulae. This may be accomplished through simple subtraction of the X and Y coordinate values of the varying P3 locations. Such values may be of use in different multi-touch gestures that may be developed using the various aspects.

In an aspect, the computing device 300 may be configured to determine the type of gesture traced by referencing a gestures data table 800, an example of which is illustrated in FIG. 9. The data table may be organized to include information about the parameter, gesture, and direction that P2 or P3 move, and identify a particular display function associated with the parameter values. For example, in row 802, the computing device may identify a pinch gesture that is used to zoom-in to a display image when the distance c is smaller than distance c'. In another example shown in row 804, when the angle D is equal to a value greater than zero and the computing device determines that the direction of movement of P2 or P3 is counterclockwise the computing device may rotate the display image in a counterclockwise direction. As shown in FIG. 9, other parameters and directions may also be used to determine the type and function of the gesture.

Once the graphical user interface type or transform function of a traced multi-touch gesture is determined, the computing device 300 may be configured to determine a corresponding transform factor (i.e., $\Delta$). The transform factor may be a value, such as a number, to be used in the transforming function that the computing device 300 uses to transform the display image consistent with the user's intent as indicated by the multi-touch gesture. For example, when a user executes a pinch gesture when an image is displayed, the transform function would be magnification and the transform factor would be the degree to which the image is to be magnified. Thus, if the determined transform factor is 10, the computing device would enlarge the displayed image by a factor of 10. Similarly, if the determined transform factor is −10, the computing device would reduce the display image by a factor of 10. For rotating transform functions, the transform factor would the number of degrees or radians of rotation to be applied to the image. Thus, in a rotating gesture with a determined transform factor of 10 degrees, the computing device would rotate the display image by 10 degrees in the clockwise direction, for example, whereas if the determined transform factor is −10, the computing device would rotate the display image by 10 degrees in the counterclockwise direction.

As mentioned above, the transform factor may be determined based upon the magnitude of changes in touch locations during the multi-touch gesture. Referring now to FIGS. 7A and 7B, in pinch gestures where a zoom function is applied to the display image, the transform factor may be determined based upon the ratio of the distance between the two fingers at the start and at the end of the gesture. For example, the transform factor may be calculated by:

$$\Delta = d'/d.$$

Or, since the change in distance between P3 and P1 is half that between P2 and P1, the transform factor may be calculated by:

$$\Delta = c'/c.$$

Alternatively, the computing device 300 may be configured to use a zoom factor look up table to determine the transform factor Δ to use based upon a measured or calculated parameter. For example, a zoom factor look-up table may indicate that a change in the P1-P3 separation distance of +1 cm corresponds to a zoom factor of 10%.

Referring now to FIG. 8, rotational transform factors can be simply calculated based on the angle D through which P3 rotates during the touch gesture or the change in the distances C and/or E may be used as transform factors. The computing device 300 may be configured to transform the display image by applying a rotating function that rotates the image by the transform factor in a linear fashion. Thus, if the rotation angle (D) is determined to 30° in clockwise direction, the computing device may rotate the display image 30° in the clockwise direction. The computing device may also be configured to apply non-linear rotational transform factors, so that the amount of rotation applied to the image per degree of angle distended in the multi-touch gesture increases as the angle of spanned by the gesture increases. For example, a rotational angle D of 5° may equate to a 5° rotational transformation of the image, while a 15° rotation angle D may equate to a 35° rotational transformation of the image. Alternatively, the computing device 300 may be configured to use a table look-up procedure to determine the transform factor to be used based on measured or calculated parameters. For example, change in the distance between C and C' of 1 cm in the clockwise direction may equate to a 10° rotational transformation of an image.

Referring to FIG. 8, in rotating gestures, a transform factor may also be calculated by calculating the $\theta_1/\theta_2$, C/C' and E/E' ratios. The computing device 300 may use these calculated ratios to determine the transform factor. Such ratio based rotational transform factors may be applied in a linear or non-linear fashion in the rotation transform function applied to an image.

Once the multi-touch gesture is recognized, the computing device 300 may determine the appropriate graphical user interface function. If the graphical user interface function is a transformation function, the computing device 300 may apply the appropriate transform function using the determined transform factor, such as to transform the displayed image in ways determined by the current application.

Figure 10:
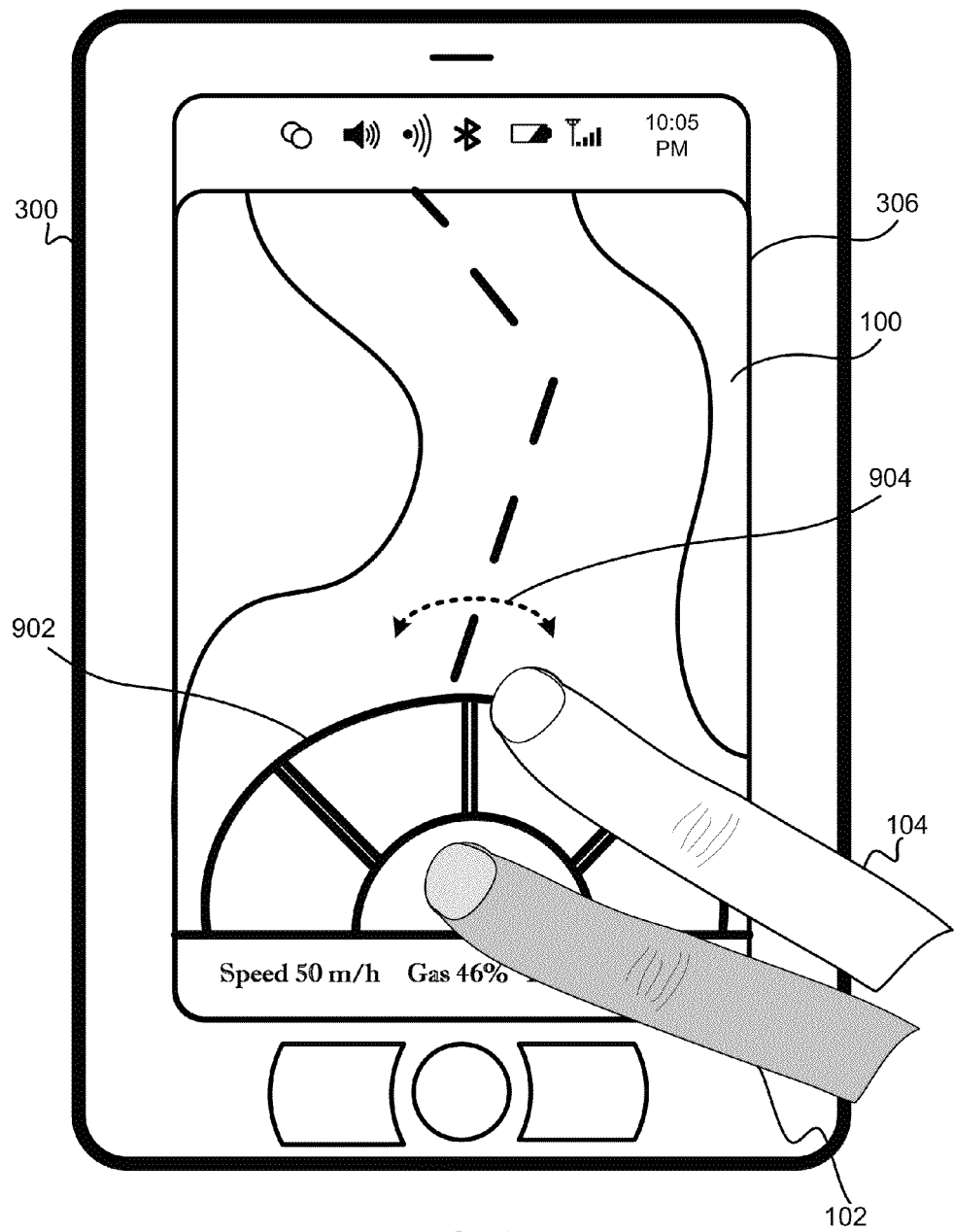
FIG. 10 is a frontal view of a computing device illustrating a multi-touch gesture used with a gaming application according to an aspect.

If the multi-touch gesture is determined to be graphical user interface input to an application, the appropriate input may be passed to an open application. For example, FIG. 10 illustrates an aspect in which the multi-touch gestures of the various aspects provide graphical user interface inputs to a driving game application. In this example, the game application may be programmed to translate multi-touch parameters calculated by the computing device 300 into game function inputs, such as steering and acceleration. For example, in a driving game like that illustrated in FIG. 10, the computing device 300 may track the change in position of P3 to determine the steering inputs to apply to a virtual automobile through a windy road. The computing device 300 may store the location of the first finger 102 and calculate different parameters (e.g., c and θ) as it detects movements of the virtual touch location caused by movement of the second finger 104 while the user tries to maneuver the automobile along a road. In this example application, the user may move a second finger 104 in the direction of the dotted line with arrows 904 to steer the automobile to the left or right using the virtual steering wheel 902.

When steering the virtual automobile to the right, for example, the computing device 300 may detect the movement of virtual touch location P3 towards the right side of the display 306 and calculate different parameters (e.g., one or more of the parameters a, b, c, c', $\theta_1$, $\theta_2$, $\theta_3$, D, C, C', E, E'), or may the appropriate graphical user interface inputs associated with the movement. The driving application may then use some or all of these parameters, or may use the graphical user interface input derived from these parameters to determine the appropriate game response. For example, the driving application may use the change between $\theta_1$ and $\theta_2$ to determine the direction and amount of steering that is intended by the user. Similarly, the application may calculate the change in distance between fingers (i.e., from c to c') to determine an acceleration to be applied to the virtual automobile.

Figure 11:
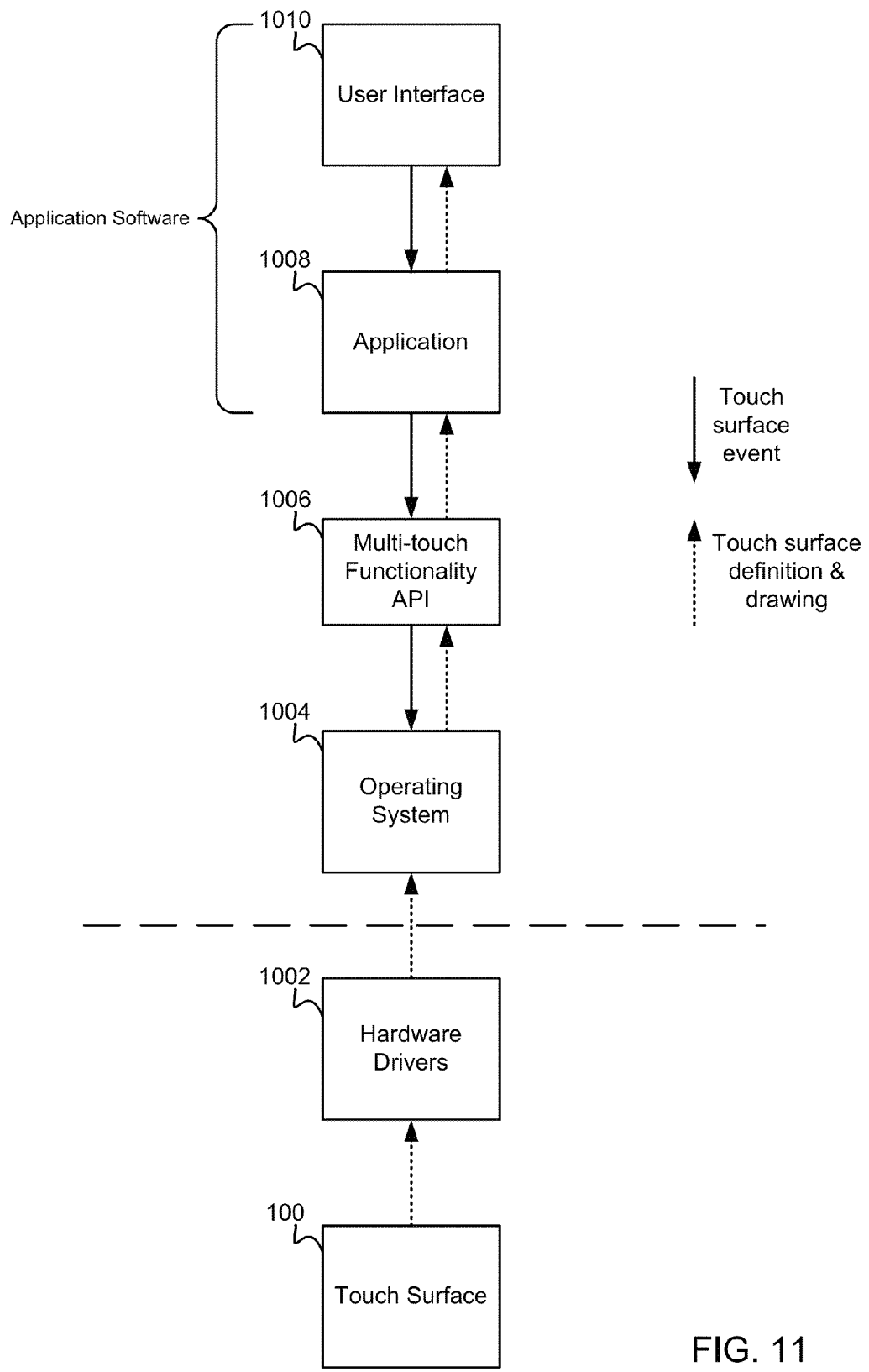
FIG. 11 is a hardware/software architecture diagram of a typical mobile device showing how touch events are communicated to application software.

Traditionally, touch surfaces 100 function by transforming a touch event on a touch surface 100 into an electrical signal that can be interpreted by the computing device 300 and its application software. FIG. 11 illustrates a hardware/software architecture of a typical computing device 300 showing how touch events are communicated to application software. There are different types of touch surfaces 100 available such as resistive and capacitive touch surfaces. Each of these touch surfaces 100 may function to detect touch events in a different way. For example, the resistive touch surface panel is composed of several layers, the most important of which are two thin, metallic, electrically conductive layers separated by a narrow gap. When an object, such as a finger, presses down on a point on the panel's outer surface the two metallic layers become connected at that point. The panel then behaves as a pair of voltage dividers with connected outputs. This causes a change in the electrical current which is registered as a touch event and sent to the controller for processing.

A capacitive touch surface panel is a sensor typically made of glass coated with a material such as indium tin oxide. This type of sensor acts like a capacitor in which the plates are the overlapping areas between the horizontal and vertical axes in a grid pattern. Since the human body also conducts electricity, a touch on the surface of the sensor will affect the electric field and create a measurable change in the capacitance of the device. These sensors work on proximity, and do not have to be directly touched to be triggered.

The electrical signals from the touch of the touch surface 100 can be processed by a hardware driver 1002. The hardware driver 1002 may be circuitry, software, or a mixture of hardware and software, depending upon the particular mobile device 300. The hardware driver 1002 converts the electrical signal received from the touch surface 100 into a format that can be interpreted by a software application running on the mobile device 300. For example, the hardware driver may convert the electrical signals to coordinates of the touch events. This signal may be in the form of an interrupted or stored value in a memory table which is accessible by application software. Such an interrupted or stored value in memory may be received by the operating system (OS) 1004.

In an aspect, the multi-touch functionality described herein may be implemented as part of the operating system 1004, as an auxiliary software application, or as a multi-touch application programming interface (API) 1006. The operating system 1004 or the multi-touch API 1006 may use the data received from the hardware driver 1002 to calculate the parameters used in determining the appropriate multi-touch gesture functionality, such as c, c', $\theta_1$, and $\theta_2$ or to transform factors such as c/c', $\theta_1$, $\theta_2$. Then, using the calculated parameters, the operating system 1004 or the multi-touch API 1006 may pass on to the application layer 1008 appropriate formatting and transforming factors based on detected multi-touch events, such as in the form of a touch event message. Touch events may also be communicated to a user-interface layer 1010, such as to display the value associated with a particular touch event.

Figure 12:
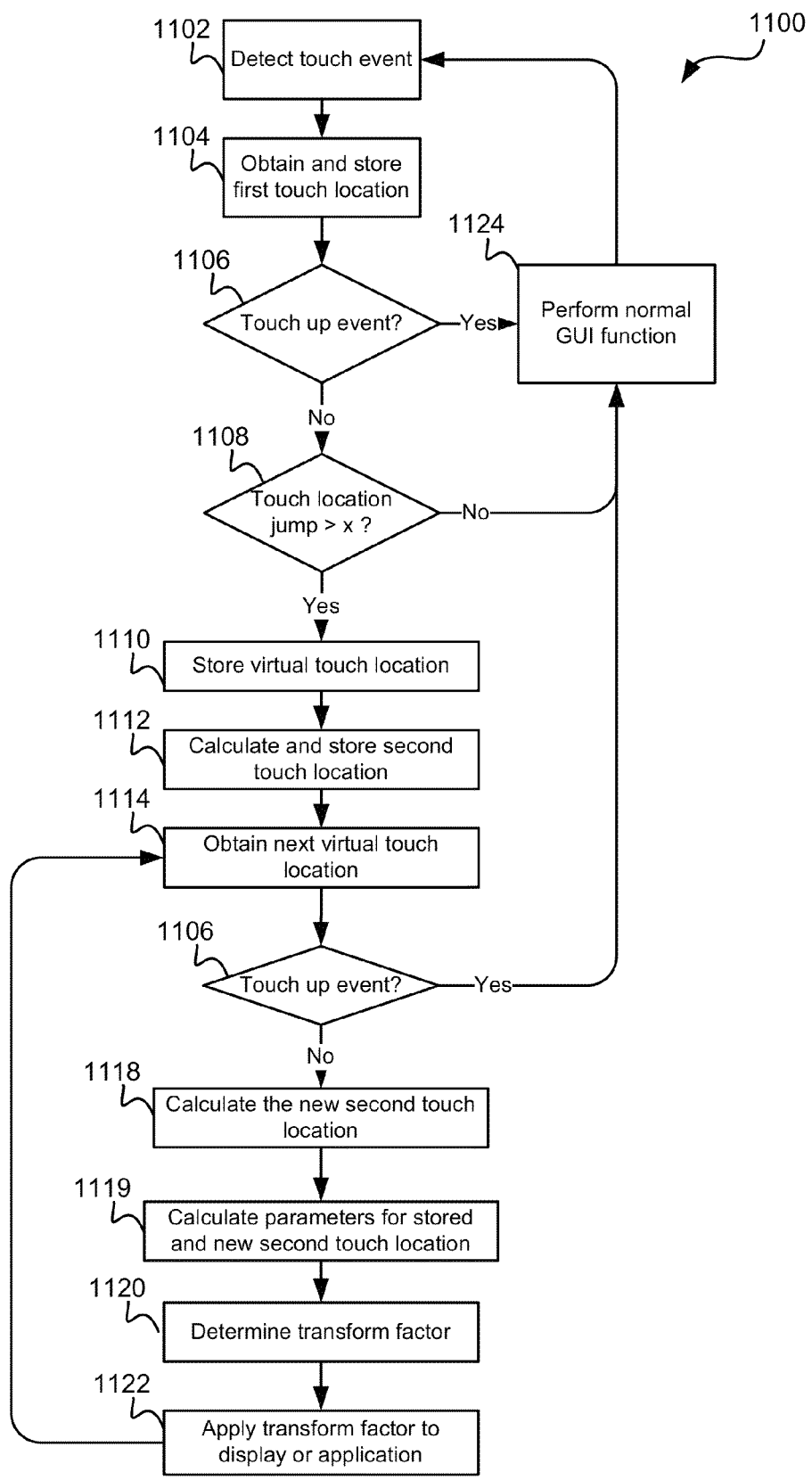
FIG. 12 is a process flow diagram of an aspect method for implementing the multi-touch gestures using second touch event locations.

FIG. 12 illustrates an example method 1100 for detecting and processing multi-touch gestures according to an aspect. In method 1100 at block 1102, the computing device 300 detects a first touch event, and obtains and stores the location of that touch at block 1104. At determination block 1106 the computing device 300 may determine whether there is a touch up, which occurs when the user lifts all fingers from the touch surface 100. If the touch event is a touch up event (i.e., determination 1106="Yes"), the computing device 300 may perform normal graphical user interface (GUI) function at block 1124, before proceeding to receive the next touch event at block 1102.

If the touch event is not a touch up event (i.e., determination 1106="No"), the computing device 300 may determine whether there has been a sudden jump in the touch location greater than a predetermined value "x" at determination block 1108. This may occur when the user touches the screen with a second finger 104. The distance of the touch location jump may be determined by calculating the distance between the first touch event locations to the location of the next touch event. The predetermined threshold value "x" may be any distance, such as a distance that is greater than the size of an average human finger tip pressed against the touch surface. If the change in position of the touch location is less than the threshold value X (i.e., determination block 1108="no"), the computing device may perform normal graphical user interface functions at block 1124 before proceeding to receive the next touch event at block 1102.

If the change in position of the touch location is greater than the threshold value X (i.e., determination block 1108="yes"), the computing device 300 may store the virtual touch event location at block 1110, and based on the virtual touch event location and the first touch location, calculate and store the location of the second touch event at block 1112. As noted above, the operation of calculating the location of the second touch event is optional, as described below with reference to FIG. 13. The computing device 300 may obtain the touch event location at block 1114, and determine whether the event is a touch up event at determination block 1106. If it is a touch up event (i.e., determination block 1106="Yes"), the computing device 300 may perform the normal (i.e., non-multi-touch) graphical user interface functions at block 1124 before proceeding to receive the next touch event at block 1102. If it is not a touch up event (i.e., determination block 1106="No"), the computing device 300 may obtain the new touch event location at block 1118, and calculate the multi-touch gesture parameters as described herein using the stored and new second touch event location data at block 1119. At block 1120 the computing device 300 may determine a transform function to be applied and a transform factor based on the calculated parameters, and apply the transform function using the transform factor to the displayed image or the currently running application at block 1122. The computing device 300 may then obtain the next touch event location at block 1114, and repeat the process until a touch up event is detected (i.e., determination block 1106="Yes").

Figure 13:
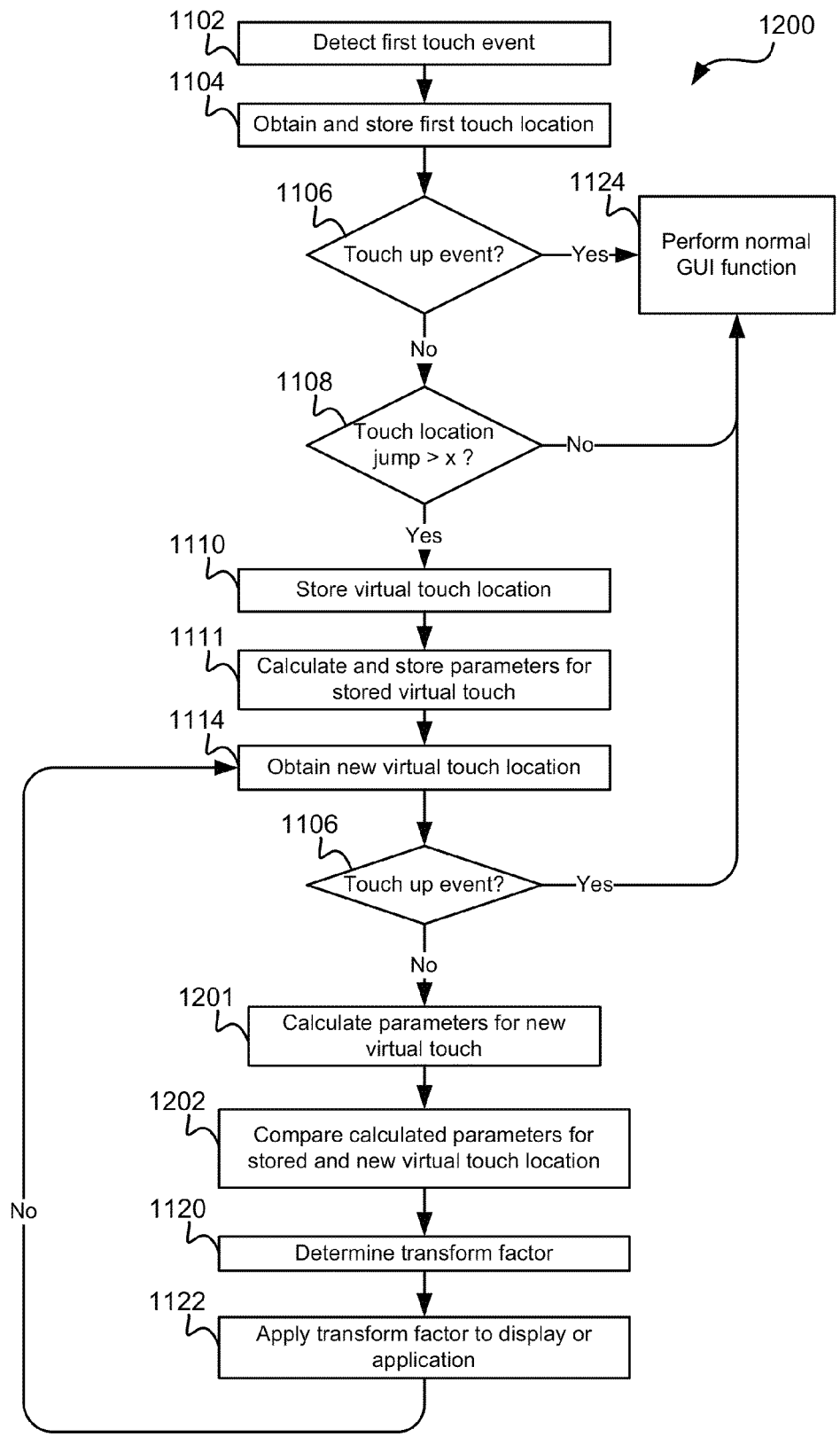
FIG. 13 is a process flow diagram of an aspect method for implementing the multi-touch gestures using the location of the virtual touch event.

FIG. 13 illustrates an example method 1200 for detecting and processing multi-touch gestures according to an aspect. In method 1200 at block 1102, the computing device 300 detects a first touch event, and obtains and stores the location of that touch at block 1104. At determination block 1106 the computing device 300 may determine whether there is a touch up, which occurs when the user lifts all fingers from the touch surface 100. If the touch event is a touch up event (i.e., determination 1106="Yes"), the computing device 300 may perform normal graphical user interface functions at block 1124, before proceeding to receive the next touch event at block 1102.

If the touch event is not a touch up event (i.e., determination 1106="No"), the computing device 300 may determine whether there has been a sudden jump in the touch location greater than a predetermined value "x" at determination block 1108. If the change in position of the touch location is less than the threshold value X (i.e., determination block 1108="no"), the computing device may perform normal graphical user interface functions at block 1124 before proceeding to receive the next touch event at block 1102. If the change in position of the touch location is greater than the threshold value X (i.e., determination block 1108="yes"), the computing device 300 may store the averaged virtual touch event location at block 1110. At block 1111 the computing device 300 may calculate and store various multi-touch gesture parameters described herein related to the virtual touch event location. At block 114 the computing device 300 may obtain a new virtual touch event location, and determine whether the event is a touch up event at determination block 1106. If the event is a touch up event (i.e., determination 1106="Yes"), the computing device 300 may perform the normal graphical user interface functions at block 1124 before proceeding to receive the next touch event at block 1102. If the event is not a touch up event (i.e., determination 1106="No"), the computing device 300 may calculate new multi-touch gesture parameters related to the new touch event at block 1201. At block 1202 the computing device may compare the calculated multi-touch gesture parameters for stored and new virtual touch event locations, and determine a transform function and associated transform factor at block 1120. At block 1122 the computing device 300 may apply the transform function using the transform factor to the displayed image or an operating application. The computing device 300 may then obtain the next touch event location at block 1114, and repeat the process until a touch up event is detected (i.e., determination block 1106="Yes").

Figure 14:
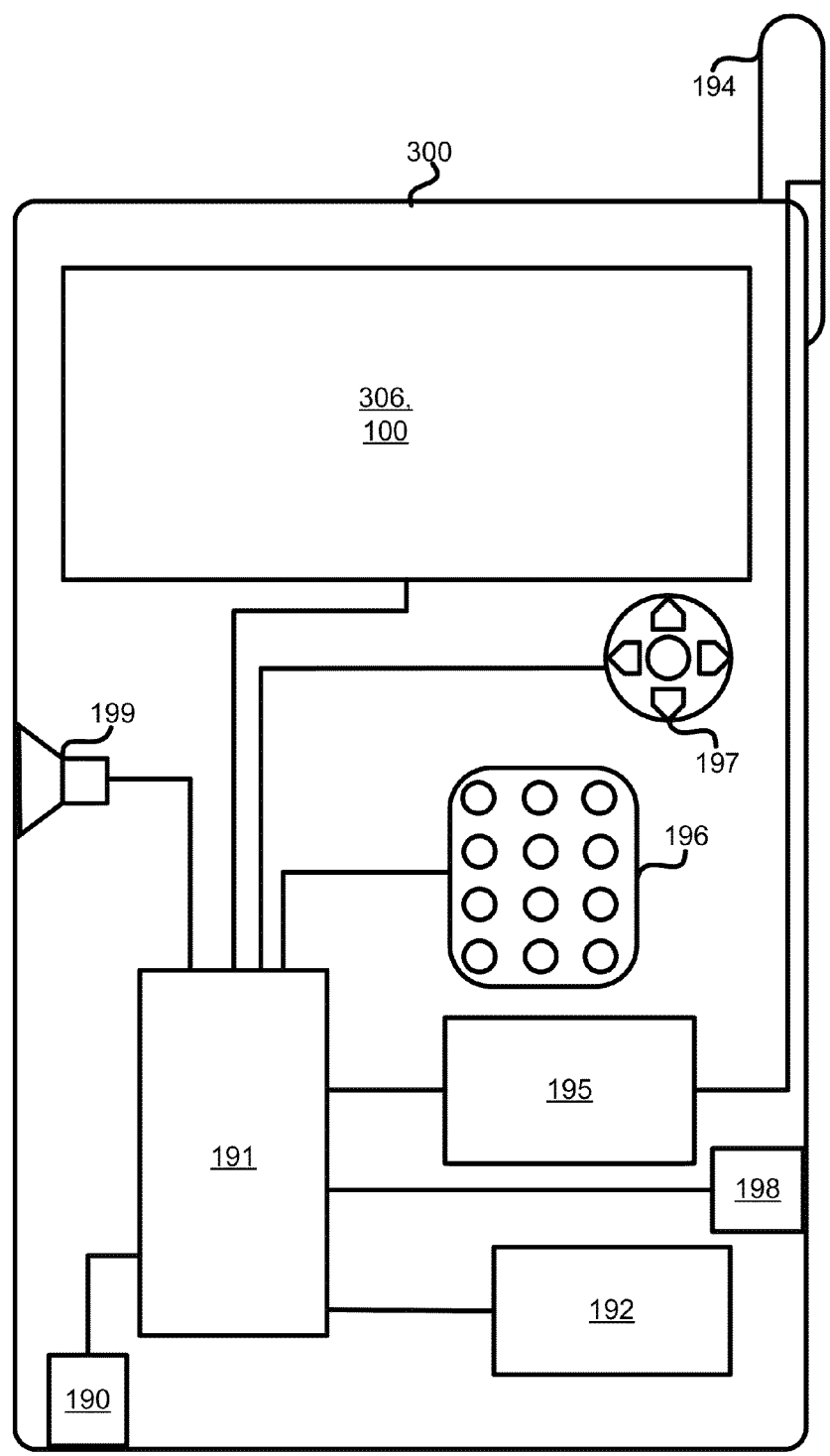
FIG. 14 is a component block diagram of an example computing device suitable for use with the various aspects.

The aspects described above may be implemented on any of a variety of computing devices 300. Typically, such computing devices 300 will have in common the components illustrated in FIG. 14. For example, the computing devices 300 may include a processor 191, coupled to internal memory 195, and a touch surface input device 100 or display 306. The touch surface input device 100 can be any type of touchscreen display, such as a resistive-sensing touchscreen, capacitive-sensing touchscreen, infrared sensing touchscreen, acoustic/piezoelectric sensing touchscreen, or the like. The various aspects are not limited to any particular type of touchscreen display or touchpad technology. Additionally, the computing device 300 may have an antenna 194 for sending and receiving electromagnetic radiation that is connected to a wireless data link and/or cellular telephone transceiver 192 coupled to the processor 191. Computing devices 300 which do not include a touch surface input device 100 (typically including a display 306) typically include a key pad 196 or miniature keyboard, and menu selection keys or rocker switches 197 which serve as pointing devices. The processor 191 may further be connected to a wired network interface 198, such as a universal serial bus (USB) or FireWire® connector socket, for connecting the processor 191 to an external touchpad or touch surfaces, or external local area network.

In some implementations, a touch surface can be provided in areas of the computing device 300 outside of the touch surface 100 or display 306. For example, the keypad 196 can include a touch surface 100 with buried capacitive touch sensors. In other implementations, the keypad 196 may be eliminated so the touchscreen display 306 provides the complete GUI. In yet further implementations, a touch surface 100 may be an external touchpad that can be connected to the computing device 300 by means of a cable to a cable connector 198, or a wireless transceiver (e.g., transceiver 192) coupled to the processor 191.

Figure 15:
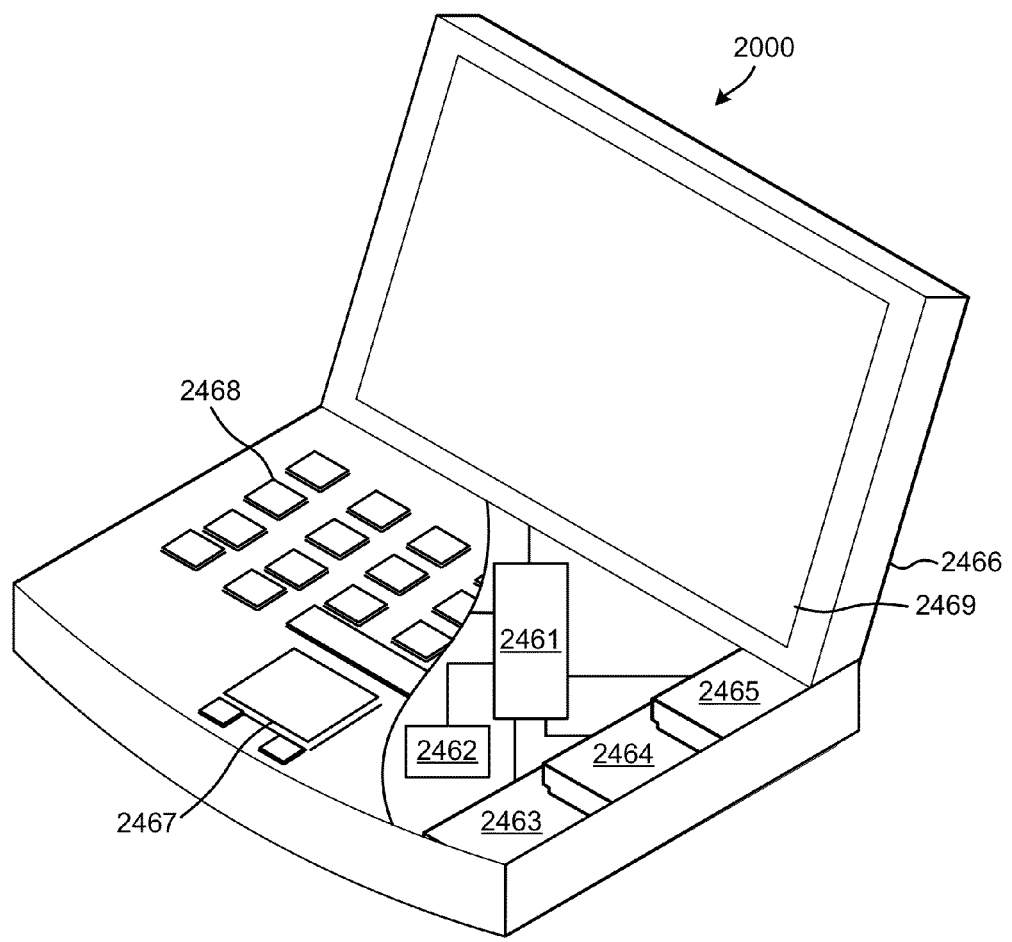
FIG. 15 is a circuit block diagram of an example computer suitable for use with the various aspects.

A number of the aspects described above may also be implemented with any of a variety of computing devices, such as a notebook computer 2000 illustrated in FIG. 15. Such a notebook computer 2000 typically includes a housing 2466 that contains a processor 2461, coupled to volatile memory 2462, and to a large capacity nonvolatile memory, such as a disk drive 2463. The computer 2000 may also include a floppy disc drive 2464 and a compact disc (CD) drive 2465 coupled to the processor 2461. The computer housing 2466 typically also includes a touchpad 2467, keyboard 2468, and the display 2469.

The computing device processor 191, 2461 may be any programmable microprocessor, microcomputer or multiple processor chip or chips that can be configured by software instructions (applications) to perform a variety of functions, including the functions of the various aspects described above. In some portable computing devices 300, 2000 multiple processors 191, 2461 may be provided, such as one processor dedicated to wireless communication functions and one processor dedicated to running other applications. The processor may also be included as part of a communication chipset.

The various aspects may be implemented by a computer processor 191, 2461 executing software instructions configured to implement one or more of the described methods or processes. Such software instructions may be stored in memory 192, 2462 in hard disc memory 2463, on tangible storage medium or on servers accessible via a network (not shown) as separate applications, or as compiled software implementing an aspect method or process. Further, the software instructions may be stored on any form of tangible processor-readable memory, including: a random access memory 192, 2462, hard disc memory 2463, a floppy disk (readable in a floppy disc drive 2464), a compact disc (readable in a CD drive 2465), electrically erasable/programmable read only memory (EEPROM), read only memory (such as FLASH memory), and/or a memory module (not shown) plugged into the computing device 300, 2000, such as an external memory chip or USB-connectable external memory (e.g., a "flash drive") plugged into a USB network port. For the purposes of this description, the term memory refers to all memory accessible by the processor 191, 2461 including memory within the processor 191, 2461 itself.

The foregoing method descriptions and the process flow diagrams are provided merely as illustrative examples and are not intended to require or imply that the processes of the various aspects must be performed in the order presented. As will be appreciated by one of skill in the art the order of blocks and processes in the foregoing aspects may be performed in any order. Words such as "thereafter," "then," "next," etc. are not intended to limit the order of the processes; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm processes described in connection with the aspects disclosed herein may be implemented as electronic hardware, computer software, or combinations of both. To clearly illustrate this interchangeability of hardware and software, various illustrative components, blocks, modules, circuits, and algorithms have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine A processor may also be implemented as a combination of computing devices, e.g., a combination of a DSP and a microprocessor, a plurality of microprocessors, one or more microprocessors in conjunction with a DSP core, or any other such configuration. Alternatively, some processes or methods may be performed by circuitry that is specific to a given function.

In one or more exemplary aspects, the functions described may be implemented in hardware, software, firmware, or any combination thereof. If implemented in software, the functions may be stored on or transmitted over as one or more instructions or code on a computer-readable medium. The processes of a method or algorithm disclosed herein may be embodied in a processor-executable software module executed which may reside on a computer-readable medium. Computer-readable media includes both computer storage media and communication media including any medium that facilitates transfer of a computer program from one place to another. A storage media may be any available media that may be accessed by a computer. By way of example, and not limitation, such computer-readable media may comprise RAM, ROM, EEPROM, CD-ROM or other optical disk storage, magnetic disk storage or other magnetic storage devices, or any other medium that may be used to carry or store desired program code in the form of instructions or data structures and that may be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions stored on a machine readable medium and/or computer-readable medium, which may be incorporated into a computer program product.

The foregoing description of the various aspects is provided to enable any person skilled in the art to make or use the present invention. Various modifications to these aspects will be readily apparent to those skilled in the art, and the generic principles defined herein may be applied to other aspects without departing from the scope of the invention. Thus, the present invention is not intended to be limited to the aspects shown herein, and instead the claims should be accorded the widest scope consistent with the principles and novel features disclosed herein.

What is claimed is:

1. A method for implementing a multi-touch gesture on a computing device having a non-multi-touch touch surface user input device, comprising:
    detecting a first location P1 of a touch event on the non-multi-touch touch surface user input device;
    storing coordinates X1, Y1 of the first location P1 of the touch event on the non-multi-touch touch surface user input device;
    detecting a jump in location of the touch event to a second virtual location P3 on the non-multi-touch touch surface user input device without detecting a touch-up event;
    activating multi-touch functionality when the jump in location determined as a distance c between locations P1 and P3 exceeds a predetermined threshold distance;
    storing the distance c and coordinates X3, Y3 of the second virtual location P3 of the touch event following the detected jump;
    determining a third virtual location P3' of the touch event upon input of a multi-touch gesture without detecting a touch-up event;
    storing coordinates X3', Y3' of the third virtual location P3';
    determining and storing a distance c' between locations P1 and P3', an angle D between lines P1P3 and P1P3', a distance C along an X-axis between P1 and P3, and a distance C' along the X-axis between P3 and P3';
    determining a graphical user interface function to be implemented based on applying the stored parameters of c, c', D, C, and C' to a gestures data table; and
    implementing the determined graphical user interface function.

2. The method of claim 1, wherein the determined graphical user interface function is a transform function, the method further comprising determining a transform factor based on the stored parameters of c, c', D, C, and C'.

3. The method of claim 1, wherein the determined graphical user interface function is an image zoom transform function,
    further comprising determining a magnification transform factor based on the stored parameters of c and c',
    wherein implementing the determined graphical user interface function comprises applying a zoom magnification to a displayed image based upon the determined magnification transform factor.

4. The method of claim 1, wherein the determined graphical user interface function is an image rotation transform function,
    further comprising determining a rotation transform factor based on the stored parameters of D, C, and C',
    wherein implementing the determined graphical user interface function comprises rotating a displayed image based upon the determined rotation transform factor.

5. The method of claim 4, wherein the rotation transform factor non-linearly increases as an angle spanned by the multi-touch gesture increases.

6. The method of claim 1, wherein determining a graphical user interface function comprises:
    determining a magnification transform factor based on the stored parameters of c and c', and
    determining a rotation transform factor based on the stored parameters of D, C, and C',
    wherein implementing the determined graphical user interface function comprises:
        applying a zoom magnification to a displayed image based upon the determined magnification transform factor; and
        rotating the displayed image based upon the determined rotation transform factor.

7. The method of claim 1, wherein determining a graphical user interface function to be implemented is performed by an operating system.

8. The method of claim 1, wherein determining a graphical user interface function to be implemented is performed by an application programming interface (API).

9. A computing device, comprising:
    a processor;
    a non-multi-touch touch surface user interface device coupled to the processor
    a memory coupled to the processor; and
    a display coupled to the processor,
    wherein the processor is configured with processor-executable instructions to perform processes comprising:
        detecting a first location P1 of a touch event on the non-multi-touch touch surface user interface device;
        storing coordinates X1, Y1 of the first location P1 of the touch event on the non-multi-touch touch surface user interface device;
        detecting a jump in location of the touch event to a second virtual location P3 on the non-multi-touch touch surface user interface device without detecting a touch-up event;
        activating multi-touch functionality when the jump in location determined as a distance c between locations P1 and P3 exceeds a predetermined threshold distance;
        storing the distance c and coordinates X3, Y3 of the second virtual location P3 of the touch event following the detected jump;
        determining a third virtual location P3' of the touch event upon input of a multi-touch gesture on the non-multi-touch touch surface without detecting a touch-up event;
        storing coordinates X3', Y3' of the third virtual location P3';
        determining and storing a distance c' between locations P1 and P3', an angle D between lines P1P3 and P1P3', a distance C along an X-axis between P1 and P3, and a distance C' along the X-axis between P3 and P3';
        determining a graphical user interface function to be implemented based on applying the stored parameters of c, c', D, C, and C' to a gestures data table; and
        implementing the determined graphical user interface function.

10. The computing device of claim 9, wherein:
    the determined graphical user interface function is a transform function; and
    the processor is configured with processor-executable instructions to perform processes further comprising determining a transform factor based on the stored parameters of c, c' ,D, C, and C'.

11. The computing device of claim 9, wherein:
the determined graphical user interface function is an image zoom transform function;
the processor is configured with processor-executable instructions to perform processes further comprising determining a magnification transform factor based on the stored parameters of c and c'; and
the processor is configured with processor-executable instructions to perform processes for implementing the determined graphical user interface function comprising applying a zoom magnification to a displayed image based upon the determined magnification transform factor.

12. The computing device of claim 9, wherein:
the determined graphical user interface function is an image rotation transform function;
the processor is configured with processor-executable instructions to perform processes further comprising determining a rotation transform factor based on the stored parameters of D, C, and C'; and
the processor is configured with processor-executable instructions such that the determined graphical user interface function comprises rotating a displayed image based upon the determined rotation transform factor.

13. The computing device of claim 12, wherein the processor is configured with processor-executable instructions to perform processes such that the rotation transform factor non-linearly increases as an angle spanned by the multi-touch gesture increases.

14. The computing device of claim 9, wherein:
the processor is configured with processor-executable instructions to perform processes such that determining a graphical user interface function comprises:
determining a magnification transform factor based on the stored parameters of c and c'; and
determining a rotation transform factor based on the stored parameters of D, C, and C'; and
the processor is configured with processor-executable instructions to perform processes such that implementing the determined graphical user interface function comprises:
applying a zoom magnification to a displayed image based upon the determined magnification transform factor; and
rotating the displayed image based upon the determined rotation transform factor.

15. The computing device of claim 9, wherein the processor is configured with processor-executable instructions to perform processes such that determining a graphical user interface function to be implemented is performed by an operating system.

16. The computing device of claim 9, wherein the processor is configured with processor-executable instructions to perform processes such that determining a graphical user interface function to be implemented is performed by an application programming interface (API).

17. A computing device, comprising:
means for detecting a first location P1 of a touch event on a non-multi-touch touch surface;
means for storing coordinates X1, Y1 of the first location P1 of the touch event on the non-multi-touch touch surface;
means for detecting a jump in location of the touch event to a second virtual location P3 on the non-multi-touch touch surface without detecting a touch-up event;
means for activating multi-touch functionality when the jump in location determined as a distance c between locations P1 and P3 exceeds a predetermined threshold distance;
means for storing the distance c and coordinates X3, Y3 of the second virtual location P3 of the touch event following the detected jump;
means for determining a third virtual location P3' of the touch event upon input of a multi-touch gesture without detecting a touch-up event;
means for storing coordinates X3', Y3' of the third virtual location P3';
means for determining a distance c' between locations P1 and P3', an angle D between lines P1P3 and P1P3', a distance C along an X-axis between P1 and P3, and a distance C' along the X-axis between P3 and P3';
means for storing parameters c', D , C, and C';
means for determining a graphical user interface function to be implemented based on applying the stored parameters of c, c', D, C, and C' to a gestures data table; and
means for implementing the determined graphical user interface function.

18. The computing device of claim 17, wherein the determined graphical user interface function is a transform function, the computing device further comprising means for determining a transform factor based on the stored parameters of c, c', D, C, and C'.

19. The computing device of claim 17, wherein:
the determined graphical user interface function is an image zoom transform function;
the computing device further comprises means for determining a magnification transform factor based on the stored parameters of c and c'; and
means for implementing the determined graphical user interface function comprises means for applying a zoom magnification to a displayed image based upon the determined magnification transform factor.

20. The computing device of claim 17, wherein:
the determined graphical user interface function is an image rotation transform function;
the computing device further comprises means for determining a rotation transform factor based on the stored parameters of D, C, and C'; and
means for implementing the determined graphical user interface function comprises means for rotating a displayed image based upon the determined rotation transform factor.

21. The computing device of claim 20, wherein the means for determining the rotation transform factor non-linearly increases the rotation transform factor as an angle spanned by the multi-touch gesture increases.

22. The computing device of claim 17, wherein means for determining a graphical user interface function to be implemented comprises:
means for determining a magnification transform factor based on the stored parameters of c and c'; and
means for determining a rotation transform factor based on the stored parameters of D, C, and C',
wherein the means for implementing the determined graphical user interface function comprises:
means for applying a zoom magnification to a displayed image based upon the determined magnification transform factor; and
means for rotating the displayed image based upon the determined rotation transform factor.

23. The computing device of claim 17, wherein means for determining a graphical user interface function to be implemented is a processor executing part of an operating system.

24. The computing device of claim 17, wherein means for determining a graphical user interface function to be implemented is a processor executing an application programming interface (API).

25. A non-transitory computer-readable storage medium having stored thereon processor-executable instructions configured to cause a processor to perform operations comprising:
- detecting a first location P1 of a touch event on a non-multi-touch touch surface;
- storing coordinates X1, Y1 of the first location P1 of the touch event on the non-multi-touch touch surface;
- detecting a jump in location of the touch event to a second virtual location P3 on the non-multi-touch touch surface without detecting a touch-up event;
- activating multi-touch functionality when the jump in location determined as a distance c between locations P1 and P3 exceeds a predetermined threshold distance;
- storing the distance c and coordinates X3, Y3 of the second virtual location P3 of the touch event following the detected jump;
- determining a third virtual location P3' of the touch event upon input of a multi-touch gesture without detecting a touch-up event;
- storing coordinates X3', Y3' of the third virtual location P3';
- determining and storing a distance c' between locations P1 and P3', an angle D between lines P1P3 and P1P3', a distance C along an X-axis between P1 and P3, and a distance C' along the X-axis between P3 and P3';
- determining a graphical user interface function to be implemented based on applying the stored parameters of c, c', D, C, and C' to a gestures data table; and
- implementing the determined graphical user interface function.

26. The non-transitory computer-readable storage medium of claim 25, wherein the determined graphical user interface function is a transform function, further comprising stored processor-executable instructions configured to cause a processor to perform operations comprising determining a transform factor based on the stored parameters of c, c', D, C, and C'.

27. The non-transitory computer-readable storage medium of claim 25, wherein the determined graphical user interface function is a image zoom transform function,
wherein the stored processor-executable instructions are configured to cause a processor to perform operations further comprising determining a magnification transform factor based on the stored parameters of c and c', and
wherein the stored processor-executable instructions are configured to cause a processor to perform operations such that implementing the determined graphical user interface function comprises instructions configured to cause a processor to perform operations comprising applying a zoom magnification to a displayed image based upon the determined magnification transform factor.

28. The non-transitory computer-readable storage medium of claim 25, wherein the determined graphical user interface function is an image rotation transform function,
wherein the stored processor-executable instructions are configured to cause a processor to perform operations further comprising determining a rotation transform factor based on the stored parameters of D, C, and C', and
wherein the stored processor-executable instructions are configured to cause a processor to perform operations such that implementing the determined graphical user interface function comprises rotating a displayed image based upon the determined rotation transform factor.

29. The non-transitory computer-readable storage medium of claim 28, wherein the stored processor-executable instructions are configured to cause a processor to perform operations such that the rotation transform factor non-linearly increases as an angle spanned by the multi-touch gesture increases.

30. The non-transitory computer-readable storage medium of claim 25, wherein:
the stored processor-executable instructions are configured to cause a processor to perform operations such that determining a graphical user interface function to be implemented comprises:
- determining a magnification transform factor based on the stored parameters of c and c'; and
- determining a rotation transform factor based on the stored parameters of D, C, and C'; and the stored processor-executable instructions are configured to cause a processor to perform operations for implementing the determined graphical user interface function by:
- applying a zoom magnification to a displayed image based upon the determined magnification transform factor; and
- rotating the displayed image based upon the determined rotation transform factor.

31. The non-transitory computer-readable storage medium of claim 25, wherein the stored processor-executable instructions are configured to cause a processor to perform operations such that determining a graphical user interface function to be implemented is implemented in an operating system.

32. The non-transitory computer-readable storage medium of claim 25, wherein the stored processor-executable instructions are configured to cause a processor to perform operations such that determining a graphical user interface function to be implemented is implemented as an application programming interface (API).

* * * * *